(12) United States Patent
Moon et al.

(10) Patent No.: US 6,437,522 B1
(45) Date of Patent: Aug. 20, 2002

(54) METHOD FOR CONTROLLING DIGITAL DYNAMIC CONVERGENCE AND SYSTEM THEREOF

(75) Inventors: Bong Mo Moon, Suwon-Shi; Ho Jin Cho, Seoul; Ick Chan Shim, Suwon-Shi, all of (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 09/865,749

(22) Filed: May 25, 2001

(30) Foreign Application Priority Data

Sep. 30, 2000 (KR) ......................... 2000-57602

(51) Int. Cl.[7] .................. H01J 29/51; H01J 9/42; H04N 9/78
(52) U.S. Cl. .................. 315/368.13; 315/368.18; 348/807; 445/3
(58) Field of Search ............. 315/368.13, 368.18, 315/368.11, 368.12, 368; 348/807, 180, 177, 190; 358/10, 135; 445/3, 63, 4, 64

(56) References Cited

U.S. PATENT DOCUMENTS

| | | | | |
|---|---|---|---|---|
| 5,159,436 A | * | 10/1992 | Soneira | 315/368.18 |
| 5,473,394 A | * | 12/1995 | Hideyuki | 315/368.12 |
| 5,532,765 A | * | 7/1996 | Inoue et al. | 348/177 |
| 5,536,192 A | * | 7/1996 | Byun | 445/3 |

FOREIGN PATENT DOCUMENTS

| | | |
|---|---|---|
| JP | 8-307898 | 8/1996 |
| KR | 1999-013780 | 2/1999 |

* cited by examiner

Primary Examiner—Don Wong
Assistant Examiner—Chuc Tran
(74) Attorney, Agent, or Firm—Darby & Darby

(57) ABSTRACT

The invention and method enable the astigmatism correction at each crossing point of a cross hatch pattern, thereby making high-resolution display possible. An appropriate voltage or current for controlling the magnetic field adjusting coils are generated from the correction data stored in a memory. The voltage or current generated are then applied to two poles, four poles or six poles during scanning of the screen.

24 Claims, 15 Drawing Sheets

METHOD FOR CONTROLLING DIGITAL DYNAMIC CONVERGENCE AND SYSTEM THEREOF

BACKGROUND OF THE INVENTION

1. Field of the Invention

The present invention relates to a device for controlling dynamic convergence by using a digital controlling method to correct arbitrary convergence astigmatism of a screen in a reflection yoke of a CRT picture device, and in particular, to a method for controlling digital dynamic convergence and a system thereof to perform individual and independent correction of the convergence with respect to each crossing point of a cross hatch pattern on a screen by receiving correction data from outside and storing the same in memory, reading the correction data from the memory, and converting the correction data to a voltage or a current so as to have a structure of outputting to magnetic field adjusting coils.

The present invention also relates to a method for controlling digital dynamic convergence and a system thereof for correcting convergence that enables a worker to perform approximate correction by generating correction data according to linear interpolation with respect to areas between crossing points when correcting each of the crossing points on a screen of a cross hatch pattern.

2. Description of the Prior Art

In general, the deflection yoke (DY) performs a function of deflecting R, G, B electron beams to desired positions on a screen of a CRT picture device. As the screens tend to be highly defined, it is impossible to achieve the converging function of the screen with the deflection yoke alone. Therefore, diverse kinds of correcting devices are usually mounted on the deflection yoke.

Of the diverse kinds of correcting devices, a dynamic convergence controller is widely used for actively controlling the converged state of the screen by attaching magnetic field adjusting coils having a structure of two poles, four poles or six poles operated under a principle of a convergence purity magnet (CPM), and moving the relative positions of R, B beams with respect to the G beam.

In particular, it is critical to apply the dynamic convergence controller to a highly defined screen leveled to a HD TV for transferring character information and graphic processing, etc. to conform to an appearance of digital TV broadcasting.

A circuit in the conventional dynamic convergence controller for a deflection yoke comprises a plurality of resistors, inductors, condensers and diodes, etc. The circuit is operated in the manner of correcting astigmatism of the screen by manually handling the controlling means such as variable resistors, etc. so as to control intensity of the current flowing in the magnetic field adjusting coils.

A current waveform predetermined in the magnetic field adjusting coils can only be applied with the adjusting circuit of the above type. Thus, the conventional adjusting circuit has a technical limit of correcting convergence astigmatism of only a few limited patterns. Furthermore, correcting a misconvergence of one area of the screen results in subsequent variation of a misconvergence of another area. Therefore, it is quite difficult to correct all the misconvergence of the entire screen.

Moreover, a worker checks the degree of convergence astigmatism with naked eyes, and properly adjusts the controlling means based on his/her own experience to correct the convergence astigmatism. Hence, it is almost impossible to correct the misconvergence of a CRT picture device having a large and flat screen with a superluminal angle to a desired level by means of such a conventional method.

The devices suggested to overcome the limit of the conventional method of measuring the convergence astigmatism with naked eyes as described above are display characteristics measuring units for measuring display characteristics of a convergence in a display device such as a color TV, color liquid crystal display (LCD) or a color plasma display panel (PDP).

This kind of a display characteristics measuring unit includes a photographing unit for separating a particular measured pattern containing a display of colors into each color component of R, G, B on a display device to be measured and photographing the same, an image processing unit for processing images of each color component and performing a predetermined further processing, and a display unit for displaying the measured result.

For instance, as disclosed in Japanese Laid-Open Patent Gazette No. 1996-307898, the convergence measuring unit photographs a white measured pattern displayed on a color CRT to be measured by a camera having a color area sensor such as a CCD, calculates a luminous center for each color component of the photographed images R, G, B while the image is processed, and displays a relative displacement of the luminous center in the amount of misconvergence.

Accordingly, the misconvergence measuring unit calculates an emitting position of a measurement pattern of each color component on a display surface of the color CRT that is measured by an image-fixed position of the measurement pattern of each color component on a photographing surface of a color camera, as well as a relative variation of the emitting position of each color component.

However, this technology poses a problem that a degree of precision easily varies depending on the temperature and humidity. For this reason, this technology is corrected by using a particular correction chart before measurement as shown in the accompanying FIG. 1.

According to the correcting method shown in FIG. 1, a correction chart 103 illuminated by a fluorescent lamp 104 (a chart including a cross hatching pattern 105 on a plate of an opaque white color) is photographed by a photographing device 101 of a convergence measuring unit 100, and the correction data showing relative positional relations between each area sensor is calculated by using the photographed image. The calculated correction data is stored in a memory within a main body 102 of the device so as to be used as data for correcting variation of the luminous center position of the measurement pattern of each color component.

According to the conventional method for correcting the relative variation of an area sensor, a position (an absolute position) of each area sensor in a reference coordinate of a convergence measuring system is calculated by using image data of each color component obtained by photographing a particular correction chart, while a relative variation of the area sensor is calculated based on that calculation. Because of the numerous computing parameters (mediating variants), a long period of time is consumed for computation.

Moreover, since a particular correction chart is used rather than a measurement pattern displayed on the CRT to be measured, a problem has arisen that it is inconvenient and difficult to correct a convergence measurement system in a production line.

The recently developed technology to overcome the above problem is the technology disclosed in Korean Laid- Open Patent Gazette No. 1999-013780. The disclosed technology is related to an automatic convergence measurement device for a color CRT.

The accompanying FIG. 1 is a schematic view illustrating construction of a convergence-measuring unit 1 for a color CRT. The convergence-measuring unit 1 comprises a photographing unit 2 and a measuring unit 3.

The photographing unit 2 photographs a predetermined measurement pattern (for instance, a cross hatching pattern, a dot pattern, etc.) displayed on a display surface of the color display 4 to be measured. A pair of photographing cameras 21, 22 is installed at the photographing device 2 for sensing images by using a stereovision method.

The measuring unit 3 computes an amount of misconvergence of a color display by using image data of the measurement pattern obtained by the photographing device 2, and displays the computed result on a displaying unit 36.

The photographing camera 21 is a color photographic device of a three-plate type, comprising a dichroic prism 212 installed at inside of the photographing unit 2 for separating the light into three colors at a rear side of the photographing lens 211, and photographing elements 213R, 213G, 213B of a solid state including the CCD area sensor allocated at the position opposed to the injecting surface of the dichroic prism 212, in which the layers of each color R, G, B appear. The photographing camera 22 is also a three-plate type color-photographing device similar to the photographing camera 21.

Installed at the photographing device 21 are a photograph controlling unit 214 for controlling operation of the photographing elements (hereinafter, referred to be as "CCD") 213R, 213G, 213B of a solid state, a focus control circuit 215 for automatically adjusting the focus by operating the photographing lens 211, and a signal processing circuit 216 for processing a predetermined image transmitted from the CCD 213R, 213G, 213B and for outputting the processed image to the measuring unit 3. Likewise, the photograph controlling unit 224, the focus control circuit 225, and the signal processing circuit 226 are installed at the photographing camera 22.

The photograph controlling unit 214 is controlled by a photograph control signal transmitted from the measuring unit 3, and the photographing operation (charge accumulating operation) of CCD 213R, 213G, 213B is controlled by the photograph control signals. Likewise, the photograph controlling unit 224 is also controlled by a photograph control signal transmitted from the measuring unit 3, and the photographing operation of CCD 213R, 213G, 213B is controlled by the photograph control signals.

The focus control circuit 215 is controlled by a focus control signal transmitted from the measuring unit 3. A front group 221A of the photographing lens 221 is operated by the focus control signal so as to fix optical image of the measurement pattern displayed on the displaying surface of the color display 4 on the photographing surface of the CCD 213R, 213G, 213B.

Likewise, the focus control circuit 225 is controlled by the focus control signal transmitted from the measuring unit 3. A front group 221A of the photographing lens 221 is operated by the focus control signal so as to fix optical image of the measurement pattern displayed on the displaying surface of the color display 4 on the photographing surface of the CCD 213R, 213G, 213B.

The focus control is performed by a signal from the control unit 33, e.g., by an equal calculation method. To be specific, in case of the photographing camera 21, the control unit 33 extracts a green high frequency component (an end portion of the measurement pattern) photographed by the CCD 213G, and outputs such a focus control signal to the focus control circuit 215 so that the high frequency component may become maximized.

The focus control circuit 215 moves the front group 211A forward and backward to finally set the photographing lens 211 at a focused position by focusing the front group 211A and slowly shortening the moving distance according to the focus control signal.

The focus control is performed by using an image photographed according to the embodiment of the present invention. However, a distance sensor is installed at the photographing cameras 21, 22, and the photographing lens 211, 221 can be operated by using distance data between the photographing cameras 21, 22 detected by the distance sensor and the display surface of the color display 4.

The measuring unit 3 comprises an analog/digital (A/D) converter 31A, 31B, an image memories 32A, 32B, the control nit 33, a data input unit 34, a data output unit 35, and the display unit 36.

The A/D converters 31A, 31B convert the image signal (analog signal) inputted from the photographing cameras 21, 22 to image data of a digital signal format. The image memories 32A, 32B store the image data outputted from each of the A/D converters 31A, 31B.

Three A/D converting circuits corresponding to the image signals R, G, B of each color component are installed at each of the A/D converters 31A, 31B. Each of the image memories 32A, 32B includes three frame memories corresponding each color component R, G, B.

The control unit 33 is an operation control circuit including a microcomputer in which a memory 332 including a ROM and a memory 331 including a RAM are installed.

A program performing a convergence measurement (a series of operations including an operation, photographing, computation of image data in an optical system) as well as data (correction values, data converting tables, etc.) required for computation are stored in the memory 331. The memory 332 provides a data area and a working area for performing diverse operations to perform the convergence measurement.

The amount of misconvergence computed by the control unit 33 (measured result) is stored in the memory 332, outputted to the displaying unit 36, and displayed in a predetermined display format. The amount of misconvergence is also outputted to an external device connected thereto (a printer or an external storing device) through the data output unit 35.

The data input unit 34 inputs diverse data for convergence measurement, and includes a keyboard, for instance. The data input unit 34 also inputs data such as a measuring point on the displaying surface of the pixel-arranging pitch color display 4 of the CCD 213, 223 through the data input unit 34.

The color display 4 to be measured includes an operation control circuit 42 for controlling the color CRT 4 displaying video images and operation of the color CRT. The video signals of the measurement pattern generated by a pattern generator 5 are inputted to the operation control circuit 42 of the color display 4 to operate the deflection circuit of the color CRT 41 in turn, and to display a cross hatching measurement pattern as displayed in FIG. 3, for example.

The measurement pattern images displayed on the color display 4 are photographed as a stereovision by the photographing cameras 21, 22 of the photographing unit 2. An amount of misconvergence is measured by image data obtained by the photographing cameras 21, 22.

To be specific, the accompany FIG. 3 is a diagram displaying the cross hatching pattern 6 displayed on the color CRT 41. The cross hatching pattern 6 is generated by crossing of a plurality of vertical lines with a plurality of horizontal lines, and displayed at a suitable size to include a plurality crossing points within the displaying surface 41a of the color CRT 41. The misconvergence amount measuring areas Al to An are set on an arbitrary position so as to have a single crossing point.

In each measuring area A(r) (r=1, 2, . . . n), the misconvergence amount ΔDX in the horizontal direction (X direction in the XY coordinate system) is computed by a photographed image of a vertical line included in the measuring area A(r), while the misconvergence amount ΔDY in the vertical direction (Y direction in the XY coordinate system) is computed by a photographed image of a horizontal line.

Even if accurate data are secured by the conventional art described with respect to the misconvergence, the ultimate object to be controlled for adjustment of the convergence is limited to the deflection yoke. Therefore, the conventional art poses a fundamental problem of failing to adjust the convergence in a partial area on an independent basis even if it is capable of adjusting astigmatism of the comprehensive convergence when adjusting the deflection yoke.

In other words, since adjustment of the convergence of one part results in variation of the convergence of another part, it has been a general practice of performing correction of the misconvergence to create a comprehensively optimal state to date.

The problem is more serious when it comes to a highly defined screen such as an HDTV.

SUMMARY OF THE INVENTION

It is, therefore, an object of the present invention to provide a method for controlling digital dynamic convergence and a system thereof for correcting convergence on an individual and independent basis with respect to an each crossing point of a cross hatch pattern on a screen by receiving correction data from outside, storing the received correction data in memories, reading the correction data from the memories in time order of screen scanning by using an image synchronous signal, converting the correction data to a voltage or a current having a structure of outputting to magnetic field adjusting coils.

It is another object of the present invention to provide a method for controlling digital dynamic convergence and a system thereof by generating correction data in accordance with linear interpolation with respect to the areas between crossing points when each crossing point performs correction on a cross hatch pattern screen.

To achieve the above objects according to one aspect of the present invention, there is provided a method for controlling digital dynamic convergence, comprising: a first step of extracting a plurality of screen positions corresponding to the crossing points on the cross hatch pattern screen in a screen display area of a CRT picture device; a second step of mapping a data storing address provided for predetermined data storing means and the plurality of screen positions extracted in the first step; a third step of measuring a degree of convergence astigmatism on each screen position extracted in the first step; a fourth step of generating correction data with respect to the convergence astigmatism at each screen position measured in the third step; a fifth step of storing the misconvergence correction data at each screen position generated in the fourth step in the data storing address mapped in the fourth step; and a sixth step of individually correcting convergence astigmatism at each screen position in the scanning order of electron beams when the image is displayed by reference to the correction data stored in the predetermined data storing means in the fifth step.

Also provided to achieve the objects of the present invention is a digital dynamic convergence control system for individual and independent correction of convergence, comprising: a measuring device for reading a predetermined image pattern displayed on a screen to measure the degree of misconvergence by reference thereto; central control means for generating correction data corresponding to the degree of misconvergence measured by the measuring device; and a digital dynamic convergence correction device for receiving the correction data from the central control means, storing the correction data in an internal memory, reading the correction data from the memory in time of screen scanning by using an image synchronous signal, converting the correction data to a voltage or a current, and outputting the converted voltage or current to magnetic field adjusting coils.

The digital dynamic convergence control device in the digital dynamic convergence control system comprises: a control unit for receiving a control command signal and correction data provided from the central control means, generating a recording address to be stored in the memory according to the control command, and controlling connections of a memory address bus and the data bus either to store the correction data in the memory or to extract correction data from the memory based on the recording address; a memory for storing the misconvergence correction data according to the recording address set by the control unit; an extracted address generation unit for generating extracted addresses to read the correction data stored in the memory by receiving horizontal and vertical synchronous signals extractable from the image signals inputted to a CRT picture device, and synchronizing the horizontal and vertical synchronous signals at scanning times of the crossing points on a cross hatch pattern screen; and an output unit for converting and amplifying the misconvergence correction data outputted from the memory according to the extracted addresses generated by the extracted address generation unit to a voltage or a current so as to be applied to magnetic field adjusting coils having a structure of two poles, four poles or six poles in order for correcting the deflected degree of electron beams.

The control unit of the digital dynamic convergence control system comprises: an address selector for controlling the respective connections of the address bus and the data bus of the memory, the extracted address generation unit and the output unit according to an inputted control signal; and a micro-controller for generating a recording address to be stored in the memory by receiving the control command signal and the correction data provided by the central control means, and manipulating the address selector to transfer the recording address to the address port of the memory when a correction signal has been provided by the control command.

The extracted address generation unit of the digital dynamic convergence control system comprises: a phase-locked loop (PLL) for receiving a horizontal synchronous signal as a reference signal, phase-locking a clock signal required for demultiplication with the horizontal synchronous signal, and outputting the phase-locked signal to synchronize output of the correction data stored in the memory in time of scanning each crossing point when dividing the screen of the cross hatch pattern; a first demultiplier for demultiplying the clock signal outputted from the PLL, and generating a horizontal address signal; a second demultiplier for receiving and re-demultiplying the output signal of the first demultiplier so as to be transferred to the PLL; a third demultiplier for generating a vertical address signal by demultiplying the horizontal synchronous signal as the clock signal by reference to the vertical synchronous signal; and an address generator for generating a memory address to extract the misconvergence correction data stored in the memory by synthesizing the vertical address signal, the horizontal address signal, and the coil address signal.

The third demultiplier of the digital dynamic convergence control system uses the number of horizontal scan lines included in one vertical interval and the number of horizontal scan lines existing on a vertical blanking interval beginning with the vertical synchronous signal to a screen display for setting a predetermined demultiplying number in a vertical direction with respect to the screen division of the cross hatch pattern, and unifying the beginning of the address to the screen starting point when generating the vertical address signal, while the second demultiplier uses the number of horizontal divisions as a control signal of division counting for setting a predetermined demultiplying number in a horizontal direction with respect to the screen division of the cross hatch pattern when generating the horizontal address signal.

The output unit of the digital dynamic convergence control system comprises: a plurality of signal amplifiers matched with each magnetic field adjusting coil corresponding to a horizontal side and a vertical side of the magnetic field adjusting coils having a structure of two poles, four poles or six poles for misconvergence correction; a plurality of D/A converters matched with each of the signal amplifiers for converting an inputted digital misconvergence correction signal to an analog signal; and a plurality of holders matched with each of the D/A converters for receiving the misconvergence correction data outputted from the memory, and renewing the output of the misconvergence correction data with respect to the magnetic field adjusting coils according to the coil address signal generated from the extracted address generation unit.

Each holder of the digital dynamic convergence control system maintains the existing misconvergence correction data until the corresponding coil address signal is provided again and an output renewal is demanded.

According to another aspect of the present invention, the digital dynamic convergence correction device in the digital dynamic convergence correction system comprises: a memory for storing individual misconvergence correction data for each crossing point of the cross hatch pattern screen; an extracted address generation unit for generating extracted addresses to read the correction data stored in the memory by synchronizing the scanning time of the crossing points of the cross hatch pattern screen by receiving the horizontal and vertical synchronous signals extractable from the image signals inputted to the CRT picture device; a control unit for access controlling the individual misconvergence correction data with respect to each crossing point of the cross hatch pattern screen stored in the memory through the extracted address generation unit; and an output unit for converting and amplifying the misconvergence correction data outputted from the memory according to the extracted addresses generated from the extracted address generation unit to a voltage or a current so as to be applied to the magnetic field adjusting coils having a structure of two poles, four poles or six poles for correction of the deflected degree of electron beams.

The control unit of the digital dynamic convergence correction device comprises: an address selector for controlling connections of an address bus of the memory, data bus, the extracted address generation unit and the output unit; and a micro-controller for controlling operation of the address selector and enabling the memory to output the misconvergence correction data stored in the address selected according to the operation of the address selector.

The extracted address generation unit of the digital dynamic convergence correction device comprises: a PLL for receiving a horizontal synchronous signal as a reference signal, phase-locking a clock signal required for division to the horizontal synchronous signal, and outputting the phase-locked signal to generate a coil address signal from the clock signal; a first demultiplier for demultiplying the clock signal outputted from the PLL to generate a horizontal address signal; a second demultiplier for receiving and re-demultiplying the output signal of the first demultiplier so as to be transferred to the PLL; a third demultiplier for generating a vertical address signal by demultiplying the horizontal synchronous signal as the clock signal by reference to the vertical synchronous signal; and an address generator for synthesizing the vertical address signal, the horizontal address signal, and the coil address signal to extract the misconvergence correction data stored in the memory.

The third demultiplier of the digital dynamic convergence correction device uses the number of horizontal scan lines included in one vertical interval and the number of horizontal scan lines existing on a vertical blanking interval beginning with the vertical synchronous signal to a screen display for setting a predetermined demultiplying number in a vertical direction with respect to the screen division of the cross hatch pattern, and unifying the beginning of the address to the screen starting point when generating the vertical address signal, while the second demultiplier uses the number of horizontal demultiplying as a control signal of multiplication counting for setting a predetermined demultiplying number in a horizontal direction with respect to the screen division of the cross hatch pattern when generating the horizontal address signal.

The output unit of the digital dynamic convergence correction device comprises: a plurality of signal amplifiers matched with each magnetic field adjusting coil corresponding to a horizontal side and a vertical side of the magnetic field adjusting coils having a structure of two poles, four poles or six poles for misconvergence correction; a plurality of D/A converters matched with each of the signal amplifiers for converting an inputted digital misconvergence correction signal to an analog signal; and a plurality of holders matched with each of the D/A converters for receiving the misconvergence correction data outputted from the memory, and renewing the output of the misconvergence correction data with respect to the magnetic field adjusting coils according to the coil address signal generated from the extracted address generation unit.

Each holder of the digital dynamic convergence control device maintains the conventional misconvergence correction data until the corresponding coil address signal is provided again and an output renewal is demanded.

According to another aspect of the present invention, the method for controlling digital dynamic convergence comprises: a first step of extracting a plurality of screen positions corresponding to the crossing points on the cross hatch pattern screen in a screen display area of a CRT picture device; a second step of mapping a data storing address provided for predetermined data storing means and the plurality of screen positions extracted in the first step; a third step of measuring a degree of convergence astigmatism on each screen position extracted in the first step; a fourth step of generating correction data with respect to the convergence astigmatism at each screen position measured in the third step; a fifth step of storing the misconvergence correction data at each screen position generated in the fourth step in the data storing address mapped in the fourth step; a sixth step of individually correcting convergence astigmatism at each screen position in the scanning order of electron beams when the image is displayed by reference to the correction data stored in the predetermined data storing means in the fifth step; and a seventh step of performing convergence correction with the lineal interpolating value of the correction data using the interpolation data in a vertical direction in the area between each screen position while performing the correction of convergence astigmatism according to the sixth step.

According to still another aspect of the present invention, the digital dynamic convergence correction system is characterized by performing an individual and independent correction of convergence with respect to crossing patterns of a cross hatch pattern to remove discontinuity of the convergence correction in a vertical direction by means of a linear interpolation in accordance with increase of horizontal scan lines with respect to a screen area between each convergence correction position, the system comprising: a measuring unit for reading a predetermined image pattern displayed on a screen to measure the degree of misconvergence by reference thereto; central control means for generating correction data corresponding to the degree of misconvergence measured by the measuring unit; and a digital dynamic convergence correction unit for receiving the correction data from the central control means, storing the correction data in internal memory, reading the correction data and interpolation data from the memory at screen scanning time by using an image synchronous signal, converting the correction data to a voltage or a current, and outputting the converted voltage or current to magnetic field adjusting coils.

According to another aspect of the present invention, the digital dynamic convergence correction device in the digital dynamic convergence correction system comprises: a control unit either for receiving convergence correction data, interpolation data and a control command signal provided by the central control means, generating a recording address to be stored in memories in accordance with the control command, storing the correction data and the interpolation data in two separate memories based on the recording address, or for controlling connection of a memory address bus and a data bus to extract the correction data and the interpolation data from each memory; a first memory for storing the misconvergence correction data at the crossing point of the cross hatch pattern screen in accordance with the recording address defined by the control unit; a second memory for storing the interpolation data by the control unit to perform interpolation at the crossing point of the cross hatch pattern screen in a vertical direction in accordance with the recording address identical to the first memory; an extracted address generation unit for generating extracted address to read the correction data and the interpolation data stored in the first and the second memories by synchronizing with the scanning time of the crossing points of the cross hatch pattern screen after receiving horizontal and vertical synchronous signals extractable from image signals; an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for converting and amplifying the correction data outputted from the interpolation unit to a voltage or a current so as to be applied to magnetic field adjusting coils having a structure of two poles, four poles or six poles in order for correction of a deflected degree of electron beams.

Also provided to achieve the objects of the present invention is a deflection yoke comprising: a coil separator consisting of a screen unit engaged with a screen surface of the CRT, a rear cover, and a neck unit elongated from a central surface of the rear cover so as to be engaged with an electron gun unit of the CRT; horizontal and vertical deflection coils provided on internal and external surfaces of the coil separator to make magnetic fields deflected in order to deflect electron beams in a horizontal direction and a vertical direction; four pairs of mutually facing magnetic field adjusting coils wound double or triple for correcting information on deflection of the electron beams in accordance with the deflection coils by being operated to have a structure of two or more poles in accordance with an operation control signal; a memory for storing individual misconvergence correction data with respect to each crossing point of a cross hatch pattern screen; an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal; and an output unit for converting misconvergence correction data outputted from the memory in accordance with the control signal of the control unit to a current or a voltage so as to be applied to magnetic adjusting coils having two or more poles for correction of the deflected degree of the electron beams.

According to another aspect of the present invention, the deflection yoke comprises: a coil separator consisting of a screen unit engaged with a screen surface of the CRT, a rear cover, and a neck unit elongated from a central surface of the rear cover so as to be engaged with an electron gun unit of the CRT; horizontal and vertical deflection coils provided on internal and external surfaces of the coil separator to make magnetic fields deflected in order to deflect electron beams in a horizontal direction and a vertical direction; four pairs of mutually facing magnetic field adjusting coils wound double or triple for adjusting information on deflection of the electron beams in accordance with the deflection coils by being operated to have a structure of two or more poles in accordance with an operation control signal; a first memory for storing individual misconvergence correction data with respect to each crossing point of a cross hatch pattern screen; a second memory for storing interpolation data for lineal interpolation within a vertical interval in accordance with increase of horizontal scan lines between each crossing point; an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal; an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for selectively applying the misconvergence correction data outputted from the interpolation unit based on the control signal of the control unit in accordance with the coil address signal of the extracted address generation unit to the magnetic field adjusting coils having two or more poles for correction of the deflected degree of the electron beams.

Also provided to achieve the objects of the present invention is a display device comprising: a deflection yoke for deflecting electron beams emitted from an electron gun; four pairs of mutually facing magnetic field adjusting coils wound double or triple for adjusting information on deflection of the electron beams caused by an operation of the deflection yoke by being operated in accordance with an operation control signal to have a structure of two or more poles; a memory for storing individual misconvergence correction data with respect to each crossing point of a cross hatch pattern screen; an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal; and an output unit for converting and amplifying the misconvergence correction data outputted from the memory according to the extracted addresses generated from the extracted address generation unit to a voltage or a current so as to be applied to the magnetic field adjusting coils having structure of two poles, four poles and six poles for correction of the deflected degree of electron beams.

According to another aspect of the present invention, the display device comprises: a deflection yoke for deflecting electron beams emitted from an electron gun; four pairs of mutually facing magnetic field adjusting coils wound double or triple for adjusting information on deflection of the electron beams caused by an operation of the deflection yoke by being operated in accordance with an operation control signal to have a structure of two or more poles; a first memory for storing individual misconvergence correction data with respect to each crossing point of a cross hatch pattern screen; a second memory for storing the interpolation data by the control unit to perform interpolation at the crossing point of the cross hatch pattern screen in a vertical direction in accordance with the recording address identical to the first memory; an extracted address generation unit for generating extracted addresses to read the correction data and the interpolation data stored in the first and the second memories by synchronizing with the scanning time of the crossing points of the cross hatch pattern screen after receiving horizontal and vertical synchronous signals extractable from image signals; an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for converting and amplifying the correction data outputted from the interpolation unit to a voltage or a current so as to be applied to magnetic field adjusting coils having a structure of two poles, four poles or six poles for correction of a deflected degree of electron beams.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENTS

Figure 1:
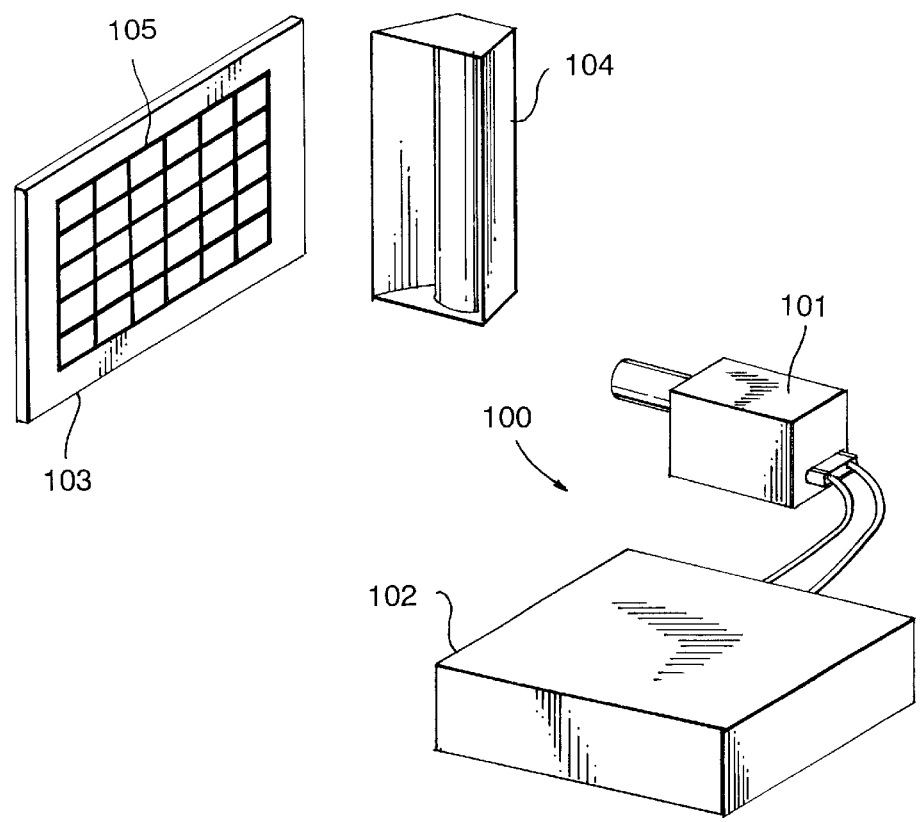
FIG. 1 is a diagram illustrating a conventional measuring device for automatically generating a misconvergence correction value.
Figure 2:
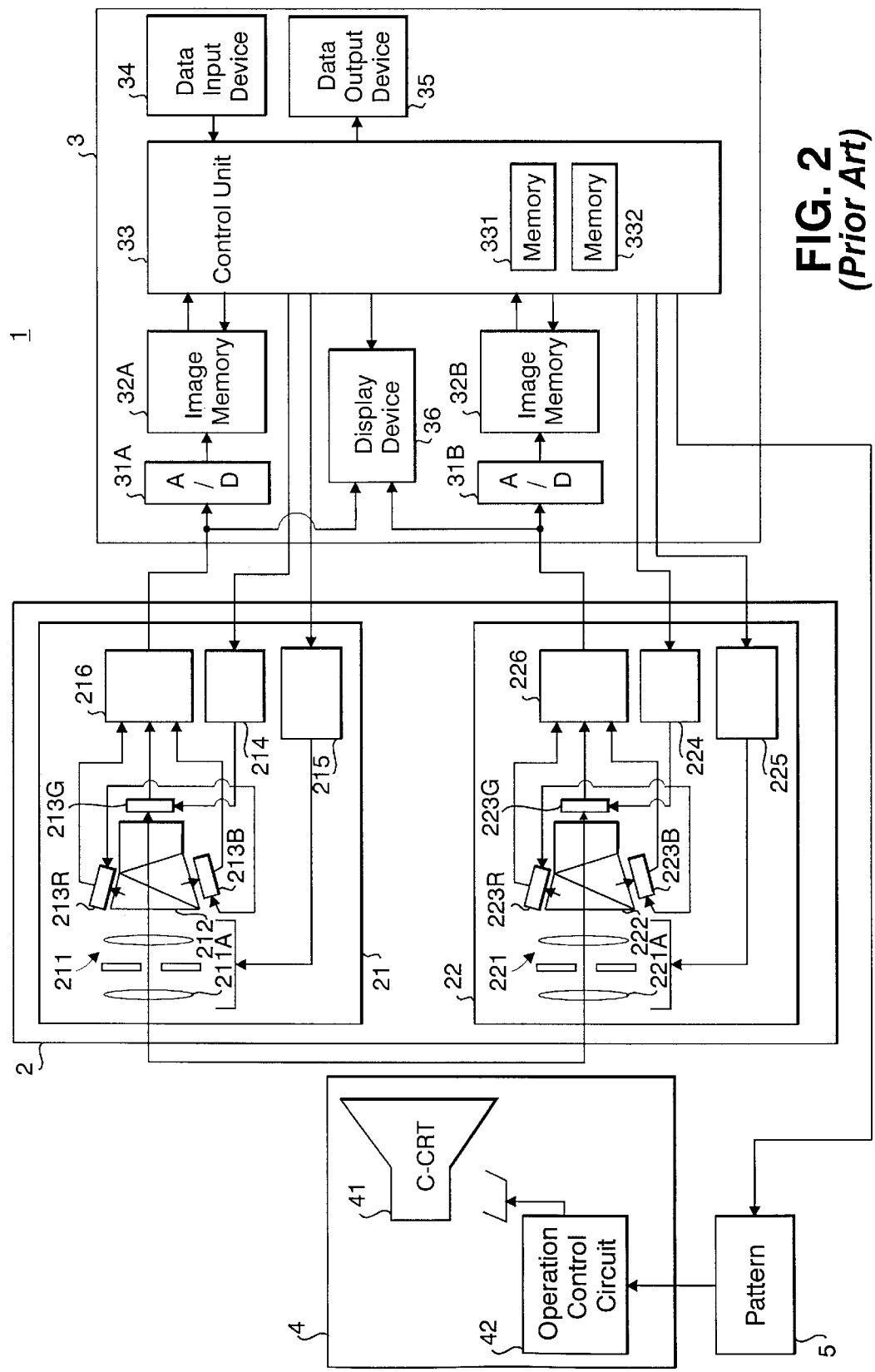
FIG. 2 is a block diagram illustrating a misconvergence-measuring device improved from the conventional art in FIG. 1.
Figure 3:
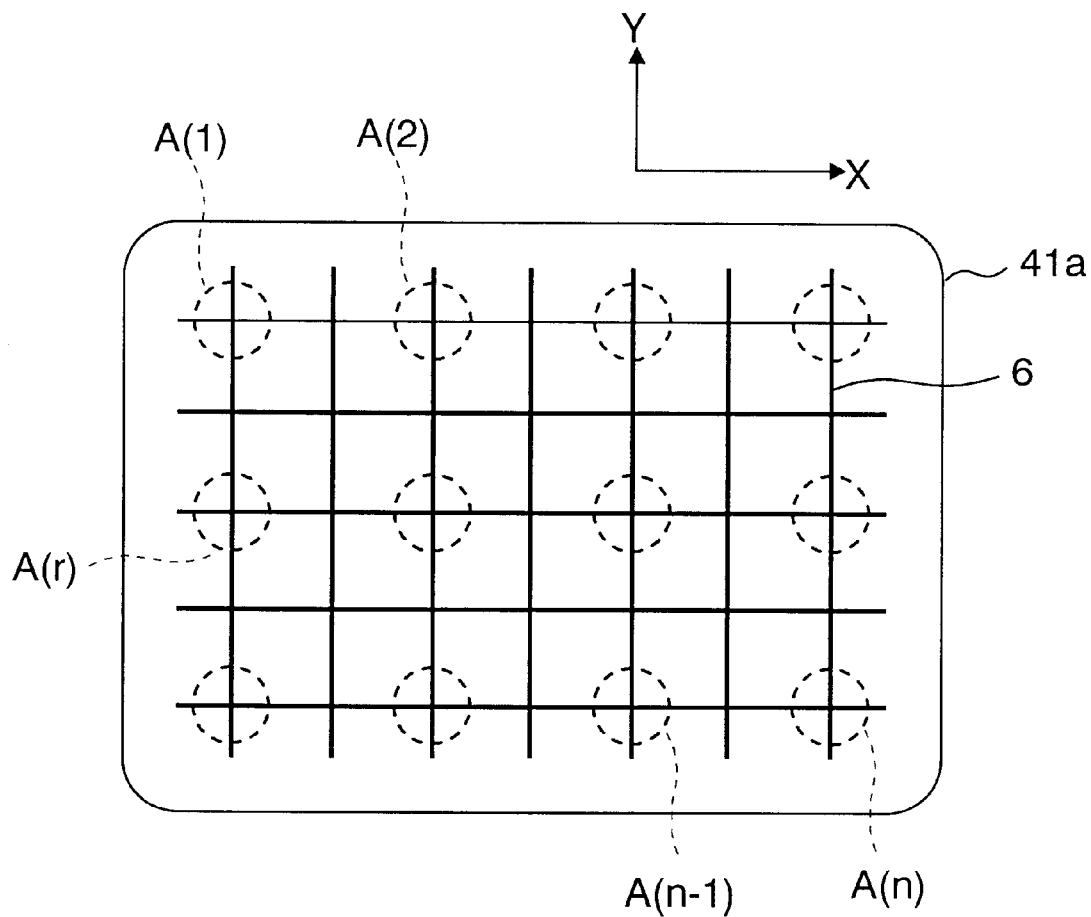
FIG. 3 is a diagram illustrating an image pattern for applying the art in FIG. 2.

Preferred embodiments of the present invention will now be described with reference to the accompanying drawings. In the following description, same drawing reference numerals are used for the same elements even in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

The following is a brief description of the technical concept applied to the present invention.

As shown in FIGS. 4 to 9, if a variable misconvergence control signal is provided on an independent basis in each divided area of the screen in accordance with scanning of electron beams, rather than the conventional method of using limited several kinds of current waveforms that are variable throughout the entire CRT screen as a misconvergence control signal applied to the magnetic field adjusting coils of two poles, four poles or six poles, different misconvergences are controlled in a plurality of areas with respect to a single field image on a screen composed of about 60 fields per second.

Accordingly, the present invention derived from the technical concept of realizing a comprehensively highly resolute screen by controlling the misconvergence in other parts on an independent basis when correcting the misconvergence in a particular part.

To be specific, an optimal degree of correction of the misconvergence of a screen on a comprehensive level according to the conventional art still poses a problem of leaving misconvergence astigmatism in a particular area of the screen. However, varying the misconvergence control signal to resolve the problem of undermining the convergence of the other areas of the screen. Thus, if is difficult to improve the convergence state of a screen on a comprehensive basis. An object of the present invention lies in controlling the misconvergence in each controlling area of a screen on an independent basis without affecting the other areas of the screen.

Figure 4:
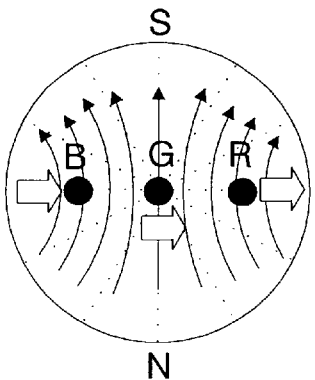
FIGS. 4 to 9 are diagrams illustrating operational characteristics of magnetic field adjusting coils having a structure of two poles, four poles or six poles generally used for dynamic convergence correction.
Figure 5:
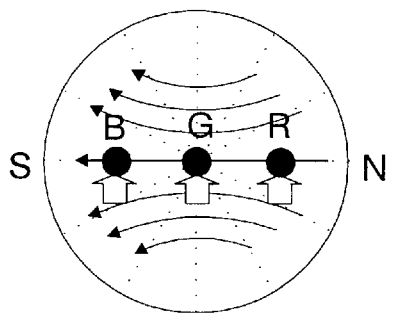

FIGS. 4 to 9 show the deflecting force affecting each of the electron beams R, G, B when a control current according to the control signal is applied to magnetic field adjusting coils of two poles, four poles or six poles employed by the present invention. FIG. 4 shows a deflecting direction of each of the electron beams R, G, B corresponding to the control current in case of magnetic field adjusting coils of two horizontal poles. Since the electron beams R, G, B uniformly move toward a horizontal direction, the movement is referred to an RGB horizontal in-phase movement. FIG. 5 shows a deflecting direction of each of the electron beams R, G, B corresponding to the control current in case of magnetic field adjusting coils of two vertical poles. Since the electron beams R, G, B uniformly move toward a vertical direction, the movement is referred to an RGB vertical in-phase movement.

Figure 6:
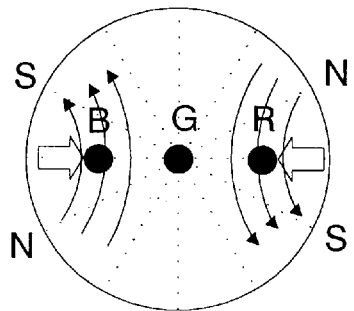
Figure 7:
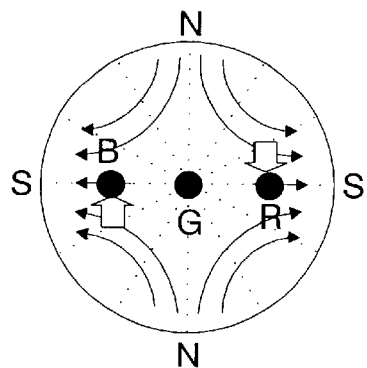
Figure 8:
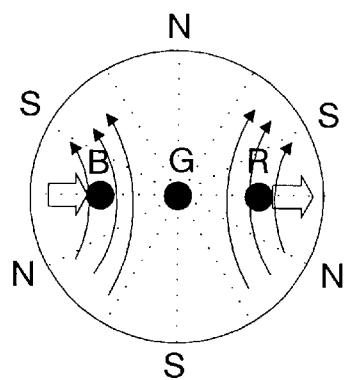
Figure 9:
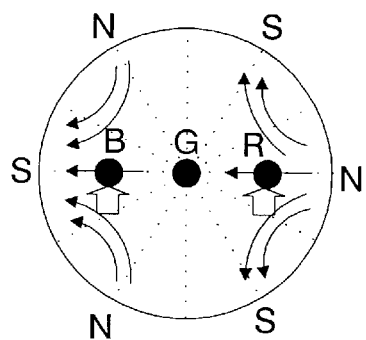

FIG. 6 shows a deflecting direction of each of the electron beams R, G, B corresponding the control current in case of magnetic field adjusting coils of four horizontal poles. Since the electron beams R and B move opposite in a horizontal direction, the movement is referred to an RB horizontal opposite phase movement. FIG. 7 shows a deflecting direction of each of the electron beams R, G, B corresponding the control current in case of magnetic field adjusting coils of four vertical poles. Since the electron beams R and B move opposite in a vertical direction, the movement is referred to an RB vertical opposite phase movement. FIG. 8 shows a deflecting direction of each of the electron beams R, G, B corresponding the control current in case of magnetic field adjusting coils of six horizontal poles. Since the electron beams R, and B move toward a horizontal direction, the movement is referred to an RB horizontal in-phase movement. FIG. 9 shows a deflecting direction of each of the electron beams R, G, B corresponding the control current in case of magnetic field adjusting coils of six vertical poles. Since the electron beams R and B move in a vertical direction, the movement is referred to an RB vertical in-phase movement. Here, the deflecting force that determines an amount of movement of the electron beams R, G, B depends on an amount of the control current applied to the magnetic field adjusting coils. Therefore, the amount of deflection can be controlled by properly controlling the amount of the control current. The combination of the magnetic field adjusting coils of two poles, fours poles and six poles of a horizontal or a vertical direction is generally referred to a convergence yoke (CY), and used as means for adjusting magnetic field.

Figure 10:
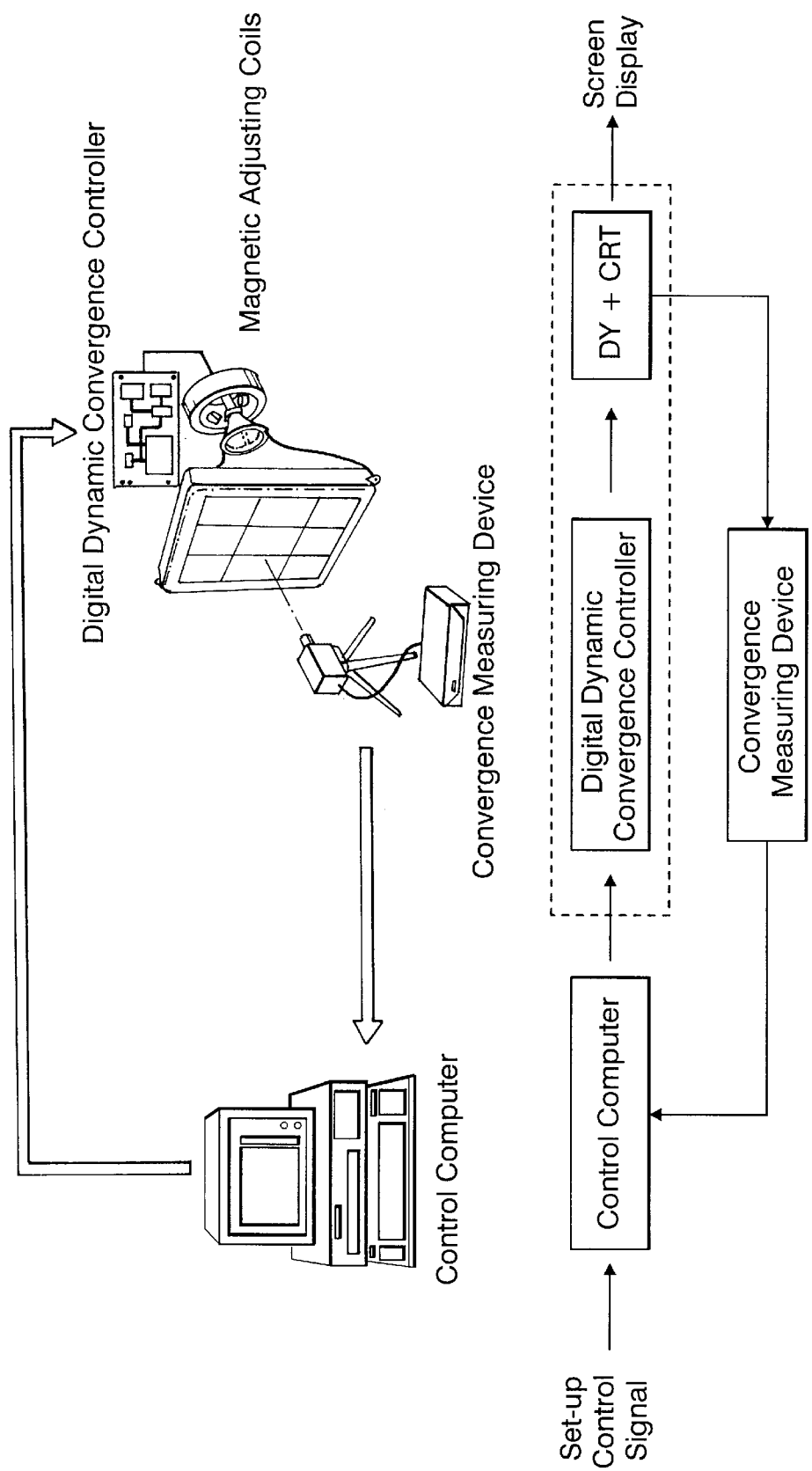
FIG. 10 is a diagram illustrating a method for controlling digital dynamic convergence according to an example of the present invention.

FIG. 10 is a diagram illustrating a method for controlling digital dynamic convergence according to an example of the present invention. The digital dynamic convergence controller in FIG. 10 is a device for operating magnetic field adjusting coils by receiving correction data with respect to the crossing points of the cross hatch pattern screen from outside, storing the correction data in the memory, receiving horizontal and vertical synchronous signals obtained from the image signals given to the CRT picture device, generating the extracted addresses of the corresponding memory by synchronizing with the scanning time of the crossing points, reading the correction data stored in the memory according to the extracted addresses, and converting and amplifying the correction data to a control voltage or a control current.

Here, the correction data are voltage values or current values to be applied to the magnetic field adjusting coils of two poles, four poles or six poles, respectively, with respect to the control points defined by each crossing point of the cross hatch pattern screen. As shown in FIG. 10, the correction data are computed by a control computer through interpretation of control logic and a beam trajectory in view of the amount of convergence astigmatism of the screen measured by the convergence-measuring device, and transferred to the digital dynamic convergence controller.

The recording address and the extracted addresses are constituted by combining the vertical position numbers, horizontal position numbers of each control point with the magnetic field adjusting coils numbers to be outputted from the control points. Individual approach and control can be performed by the recording address and extracted address with respect to the convergence of each control point.

Figure 11:
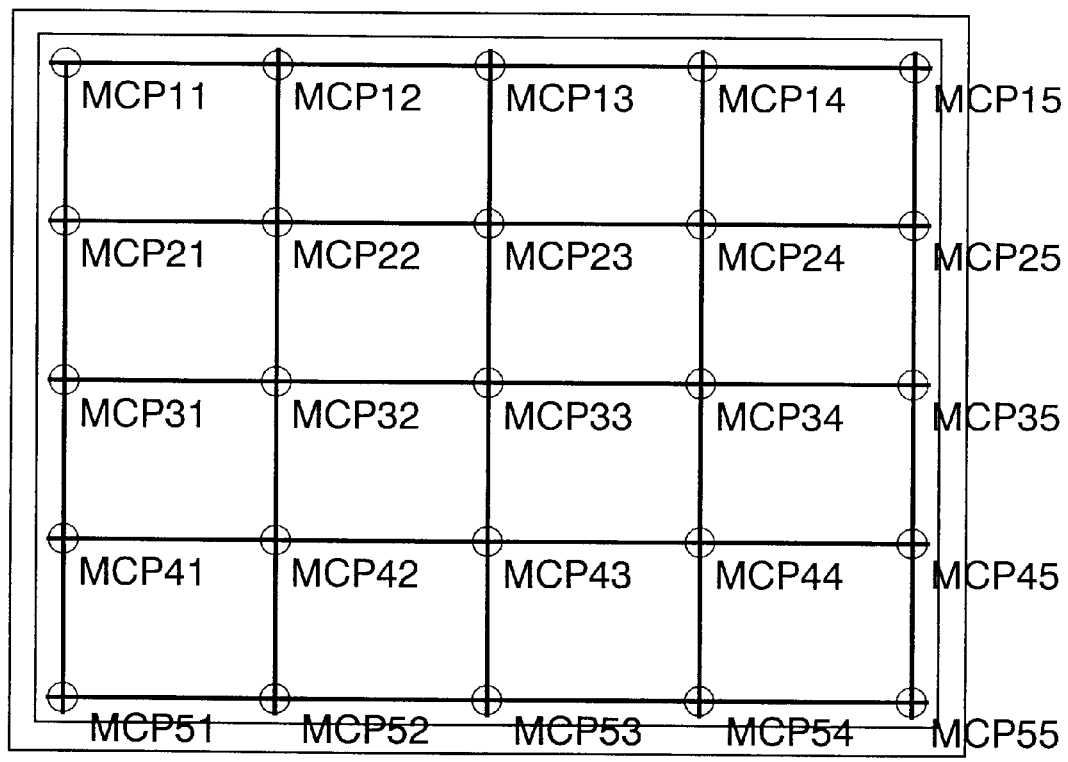
FIG. 11 is a diagram illustrating an image pattern for applying the present invention.

Independent control of the convergence can be performed in this manner with respect to each control point (MCP11-MCP55) in FIG. 11. To be specific, it is a manner of controlling all the amount of current of the magnetic field adjusting coils of two poles, four poles or six poles as shown in FIGS. 4 to 9 from each control point on the screen. It is apparent from the operational principle of the magnetic field adjusting coils that the convergence of the electron beams R, G, B can be controlled to be an arbitrary state. For reference, the operational principle of the magnetic field adjusting coils is conceptually identical to that of a convergence purity magnet mounted on a neck of the deflection yoke.

The automatic screen correction system shown in FIG. 10 is a closed loop structure. Once after achieving the desired convergence performance by repeating the correction process several times as described above, the ultimate correction data are stored in EEPROM provided inside of the digital dynamic convergence controller. Thereafter, the part indicated in dotted lines in FIG. 10 can only be operated on an independent basis.

If the correction process is completed, and the combination of the digital dynamic convergence controller, magnetic field adjusting coils, deflection yoke with the CRT is separated from the automatic screen correction system and a power is supplied, the digital dynamic convergence controller reads the correction data stored in the EEPROM provided inside thereof., and operates in an open look structure to correct convergence astigmatism of the screen.

As described with respect to FIG. 10, the control computer outside of the digital dynamic convergence controller performs a decision of the correction data. Thus, the micro-controller inside of the digital dynamic convergence controller merely performs a data transmission and storage as well as a slight control, thereby not requiring high performance. The micro-controller inside of the digital dynamic convergence controller has a structure of outputting the data stored in the memory only without undergoing the process of calculating inside the digital dynamic convergence controller, and is suitable for performing the correction in real time by being synchronized with the image scanning at the positions of the control points on the screen.

Figure 12:
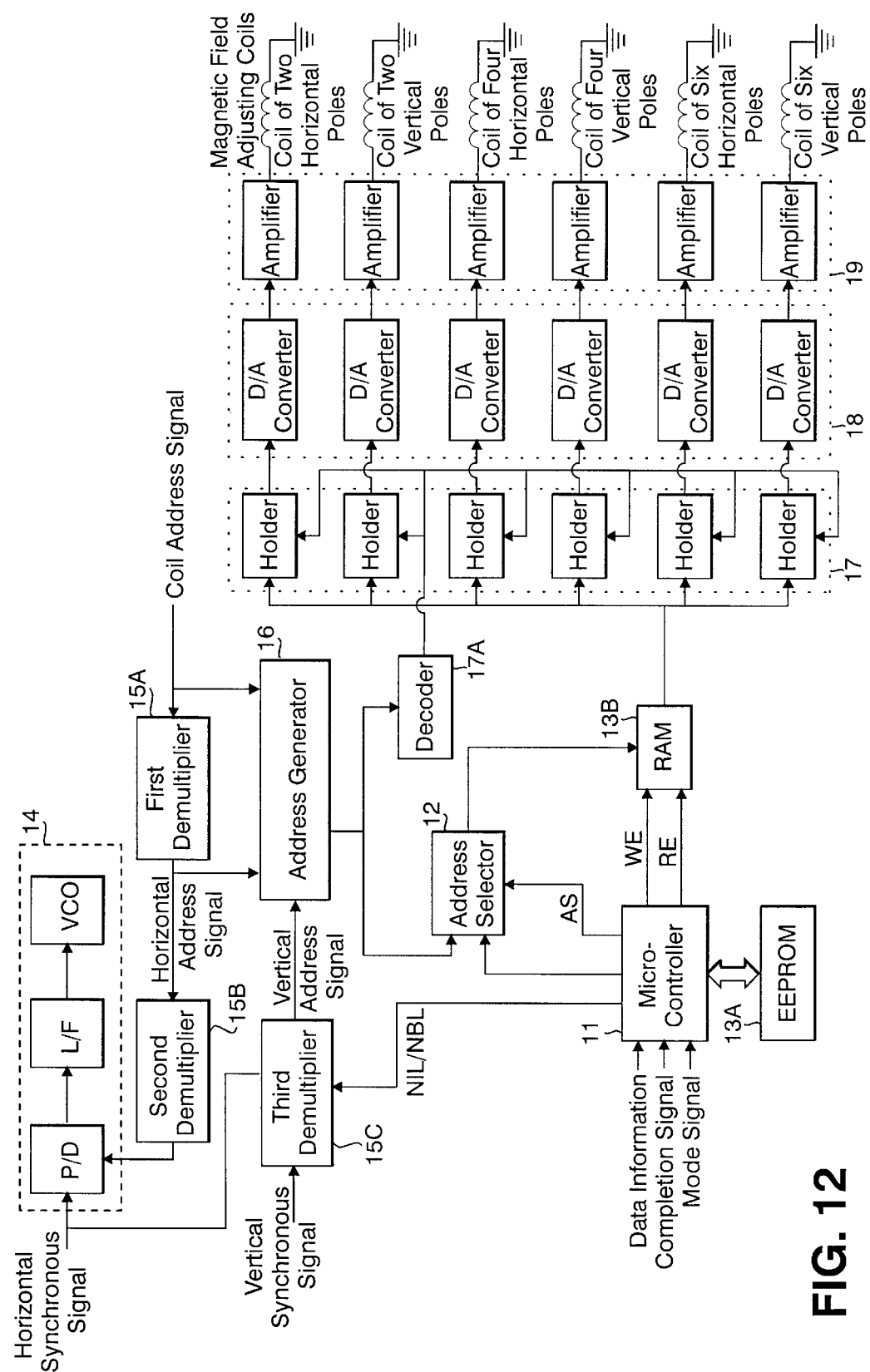
FIG. 12 is a block diagram illustrating a construction of a digital dynamic convergence correction device according to an embodiment of the present invention.

The following is a description of the construction and operation of the digital dynamic convergence controller made with reference to FIG. 12.

The digital dynamic convergence controller in FIG. 12 comprises a control unit consisting of a micro-controller 11 and an address selector 12, a storing unit consisting of an EEPROM 13A, a RAM 13B, an extracted address generation unit consisting of an address generator 16 including a PPL 14, demultipliers 15A to 15C and a digital logic circuit, and an output unit consisting of a holder 17, a D/A converter 18 and an amplifier 19.

The micro-controller 11 of the control unit receives a mode signal pre-set outside thereof to determine whether the current mode is a closed loop mode for generating misconvergence correction data or an open loop mode for processing the misconvergence correction data stored in the EEPROM 13A.

If the mode signal is in "on" state, control unit is in a closed loop mode to generate a recording address to be stored in the memory by receiving the correction data provided from outside and a control command signal. If the control command signal is in provided to be in "off" state, the control command signal is a control signal referred to as an "AS". Then, the micro-controller 11 manipulates the address selector 12 so that the recording address can be transferred to the address port of the RAM 13B, and stores the correction data in the RAM 13B by transferring the correction data provided together with a write enable (WE) signal to the data port of the RAM 13B. If the completion signal is provided to be in "on" state as a control command signal upon completion of the convergence correction, the correction data are stored in the EEPROM 13A.

If the mode signal is in "off" state, the control unit is in an open loop mode. Then, the micro-controller 11 extracts the correction data stored in the EEPROM 13A, transfers the extracted correction data to the RAM 13B, and records the same.

After recording the correction data in the RAM 13B, the micro-controller 11 generates a control signal AS, and manipulates the address selector 12 so that the extracted addresses outputted from the address generator 16 can be transferred to the address port of the RAM 13B. At the same time, the micro-controller 11 transfers a read enable (RE) signal to the RAM 13B so as to make the RAM 13B readable.

Figure 13:
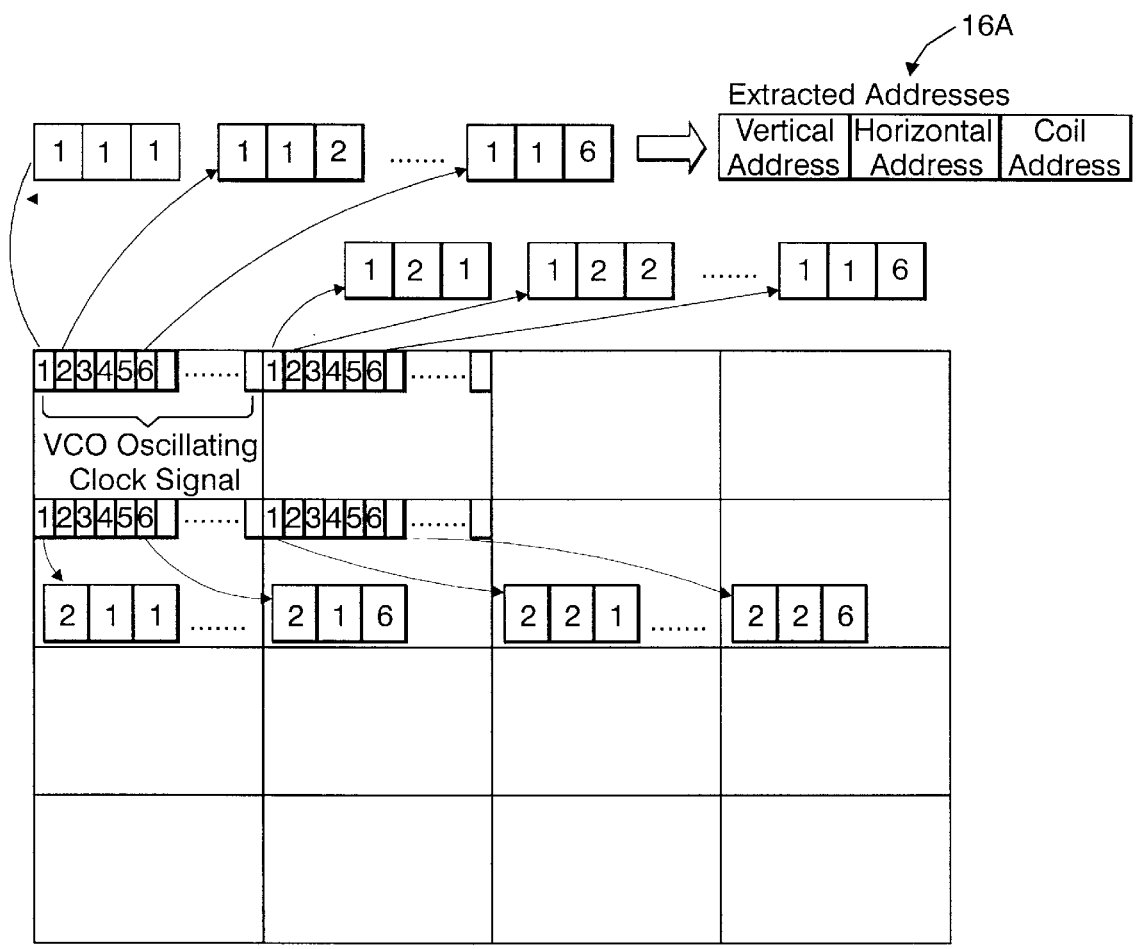
FIG. 13 is a block diagram illustrating extracted addresses generated by an address generator according to the present invention.

In the above process, the extracted address generation unit receives the horizontal and vertical synchronous signals extractable from the image signal to generate a coil address signal and a horizontal address signal by using the PLL 14, a i first two-phase demultiplier 15A, and a second two-phase demultiplier 15B with respect to the horizontal synchronous signal as well as to generate a vertical address signal through a third demultiplier 15C by using the horizontal synchronous signal as a clock signal with respect to the vertical synchronous signal. As shown in FIG. 13, the extracted address generation unit also generates extracted addresses 16A to read the correction data stored in the RAM 13B by combining the horizontal address signal with the coil address signal.

As shown in FIG. 13, the extracted addresses consist of three address bit portions of a vertical address, a horizontal address, and a coil address. The vertical address and the horizontal address refer to the positions of the control points on the screen. The coil address has a value of being increased in order from 1 to 6 in accordance with generation of the clock of the coil address signal, which is a VCO oscillating clock signal, at each control point of the screen.

FIG. 13 illustrates values of the extracted addresses generated by being synchronized with scanning of the control points on the screen.

Here, the frequency of the VCO oscillating clock signal 14B in the phase-locking state of the PLL 14 is determined by demultiplying the frequency of the horizontal synchronous signal, which is a reference clock signal, by the demultiplying number of the first and the second two-phase demultipliers 15A, 15B. The VCO oscillating clock signal 14A is used as the coil address signal so as to be assigned to the corresponding address bit of the extracted addresses 16A through a logic circuit inside of the address generator 16.

Also, the clock signal outputted from the VCO oscillating clock signal through the first demultiplier 15A is used as a horizontal address signal, and is assigned to the corresponding address bit of the extracted addresses 16A through the logic circuit inside of the address generator 16. The horizontal address signal is fed back to a phase detector P/D of the PLL 14 through the second demultiplier 15B as the clock signal. Here, the demultiplying number NVCO of the first demultiplier 15A refers to the number of the VCO oscillating clock signal included in one horizontal interval on the divided screen of the cross hatch pattern, while the demultiplying number NHD of the second demultiplier 15B refers to the number of horizontal divisions of the screen. For reference, since the VCO oscillating clock signal is used as a coil address signal, the demultiplying number NVCO is set to be a fairly high value. Accordingly, the coil address is varied from 1 to 6 at very short time intervals from each control point of the screen, as shown in FIG. 13.

When generating the vertical address signal, the third demultiplier 15C counts only once as much as the demultiplying number NBL whenever each vertical synchronous signal begins by using the horizontal synchronous signal as the clock signal, and outputs the clock signal by counting the demultiplying number NIL. This clock signal is used as the vertical address signal to be assigned to the corresponding bit of the extracted address 16A through the logic circuit inside of the address generator 16. Here, the demultiplying number NIL refers to the number of the horizontal scan lines included within one vertical interval on the divided screen, while the demultiplying number NBL is a control value required for synchronizing the beginning of the vertical address signal with display of the screen, and refers to the number of horizontal scan lines precluding the image signal that covers the beginning of the vertical synchronous signal to display of the screen.

The demultiplying numbers of the first, second and third demultipliers are pre-set by the micro-controller 11 before commencing the convergence correction. Those values are provided from outside by the control computer in accordance with the number of horizontal and vertical divisions of the crosshatch pattern screen. Upon completion of the correction, the values are stored in the EEPROM 13A together with the correction data.

Thereafter, the extracted addresses generated by the address generator 16 of the extracted address generation unit are transferred to the address port of the RAM 13B. The corresponding correction data are synchronized with the scanning time of the control points of the screen, and are transferred to the output unit in real time from the RAM 13B that has been set to be a readable state.

The output unit converts the correction data read from the RAM 13B through the extracted address generated by the address generator 16 in time of the screen scanning to a voltage or a current through the holder 17 and the D/A converter 18 so as to be outputted through the amplifier 19. The control voltage or the control current is applied to the magnetic field adjusting coils so as to generate a magnetic field, the convergence astigmatism of which is to be corrected.

Here, the signal obtained through a decoder 17A from the coil address among the extracted addresses of the address generator 16 is used as the control signal for renewing output of the holder 17. As a consequence, the correction data extracted from the RAM 13B can be outputted to the corresponding magnetic field adjusting coil through the holder 17 corresponding to the coil address and the D/A converter 18. The holder 17 maintains the correction data until a renewal control signal is provided again.

The above description pertains to parts of the present invention. The following is a description of the process of generating the misconvergence correction data made with reference to FIGS. 10 to 12.

An inspector or a worker manipulates a mode shifting switch such as a jump switch in the producing process using the automatic screen correction system shown in FIG. 10 to notify inside of the digital dynamic convergence controller, i.e., the micro-controller 11 shown in FIG. 12, that the current mode is a closed loop mode for generating the misconvergence correction data through the mode signal.

Subsequently, the convergence-measuring device of the automatic screen correction system displays the image of the crosshatch pattern as shown in FIG. 11 in the CRT picture device to be corrected. At the same time, scanning position on the screen as well as mapping of the memory address are performed with respect to each of the crossing points MCP11 to MCP55 of the cross hatch pattern screen shown in FIG. 11 through the PLL, the demultiplier and the address generator that are identified as the drawing reference numerals 14, 15 and 16.

Thereafter, the data of the misconvergence degree in the image read by the convergence measuring device in the course of passing through each of the crossing points MCP11 to MCP55 of the electron beams in accordance with horizontal and vertical scanning thereof are provided to the control computer.

In consideration of the provided information on the misconvergence, the control computer generates the data for correction of the misconvergence with respect to the crossing points MCP11 to MCP55. According to an embodiment of the present invention, 25 correction data are generated and transferred to the digital dynamic convergence controller.

Subsequently, the digital dynamic convergence controller stores the inputted correction data in the RAM 13B, and performs correction of the misconvergence for each of the crossing points MCP11 to MCP55 in time of scanning the electron beams by reference to the correction data stored in the RAM 13B with respect to the cross hatch pattern screen in FIG. 11.

Here, the convergence state of the displayed crosshatch pattern screen is read by the convergence-measuring device so as to be provided for the control computer. Repetition of such a process determines the optimal misconvergence correction data for each of the crossing point MCP11 to MCP55.

If the control computer notifies the digital dynamic convergence controller of completion of the correction of the convergence, the micro-controller 11 provided inside of the digital dynamic convergence controller stores the correction data of the convergence for each of the crossing points MCP11 to MCP55 in the EEPROM 13A, which is a non-volatile memory element.

If a power supply is applied to the corresponding CRT picture device after the product is marketed upon completion of the correction of the convergence by undergoing the above process, the micro-controller 11 is operated on an independent basis because no correction data or control command signal are inputted any longer. The following is a description of the process made with reference to FIGS. 11, 12 and 4 to 9.

The CRT picture device, to which the present invention is applied, displays images by reference to the inputted image signals. The digital dynamic convergence controller according to the present invention extracts a horizontal synchronous signal and a vertical synchronous signal to map the scanning positions on the screen corresponding to each of he crossing points MCP11 to MCP55 shown in FIG. 6 as well as the address of the RAM 13B. At this stage, the crosshatch pattern screen is not displayed in fact unlike in FIG. 11.

Thereafter, the misconvergence correction data with respect to each of the crossing points MCP11 to MCP55 stored in the EEPROM 13A are loaded on the RAM 13B, while the misconvergence correction data with respect to each of the crossing points MCP11 to MCP55 stored in the RAM 13B are accessed in order in time of the scanning of the electron beams based on the extracted addresses outputted in real time by the address generator 16.

At this stage, the holder 17 connected to the magnetic field adjusting coils corresponding to the coil address of the extracted addressed is selected in a predetermined order. The output value of the holder 17 is renewed to be correction data outputted by the RAM 13B so as to be transferred to the D/A converter 18. As a result, the magnetic field of the magnetic field adjusting coils is adjusted to correct the misconvergence of the screen.

For example, assuming that the electron beams corresponding to R and B are biased inward and deflected upward without any variation in the electron beam G according to the misconvergence correction data of the crossing point, which is identified by a drawing reference numeral MCP11, i.e., assuming that the electron beams are a combination of the deflection of two kinds as shown in FIGS. 6 and 9, the correction data with respect to the coil of four horizontal (H4) poles and the coil of six vertical (V6) poles only have meaningful values other than zero.

If an output of the magnetic field adjusting coils is set to be in the order of H4 poles, V4 poles, H6 poles, V6 poles, H2 poles and V2 poles, the correction are outputted in the same order. However, the correction data are zero with respect to the coils except the ones of H4 poles and V6 poles. Therefore, no voltage or current is applied to those coils. As a consequence, the magnetic field of the coils of H4 poles and V6 poles only are corrected for correction of the convergence.

Thus, the convergence state of each crossing point of the crosshatch pattern screen, in which the misconvergence correction is performed, can be controlled on an individual basis without undermining the other crossing points. The convergence performance can be enhanced as a consequence. Granting an enlargement of the capacity of memories, the screen of comprehensively high resolution can be easily realized. As described above in detail, the demultiplying numbers of the first, the second and the third demultipliers 15A, 15B, 15C can be varied according to the present invention. This means that the number of horizontal and vertical divisions of the screen can be arbitrarily changed within the limit of the capacity of the memories.

For reference, assuming that the number of horizontal and vertical divisions are N and M, respectively, and the size of the correction data is one byte, the capacity of memories consumed in the RAM 13B and the EEPROM 13A can be calculated to be (N×M)×6. The reason for demultiplying 6 in the calculation of the capacity of memories is based on the assumption that a total of six magnetic field adjusting coils are used at each control point of the screen. For example, a fairly small amount of capacity of memory, i.e., 5×5×6=150 byte, is required for division of the screen according to the embodiment shown in FIG. 6.

The digital dynamic convergence controller described above carries an effect of notably improving the convergence around the crossing points of the cross hatch pattern screen in comparison with the conventional method. However, a slight degradation may occur in the area between each crossing point.

The following is a description of another example of the present invention to prevent the degradation.

The reason for causing the problem in the convergence correction circuit according to the present invention shown in FIG. 12 is as follows. Since the correction data are calculated at each crossing point of the cross hatch pattern screen, as shown in FIG. 11, all of the data loaded on the horizontal synchronous signal existing between each crossing point depend on the previous correction data values. Therefore, substantial degradation of the periphery of the screen may occur.

In other words, since the convergence correction circuit according to the present invention shown in FIG. 12 does not generate the correction data with respect to all of the pixel points, the convergence is improved on a comprehensive basis in comparison with the conventional art. However, the improved convergence is not perfect per se.

Figure 14:
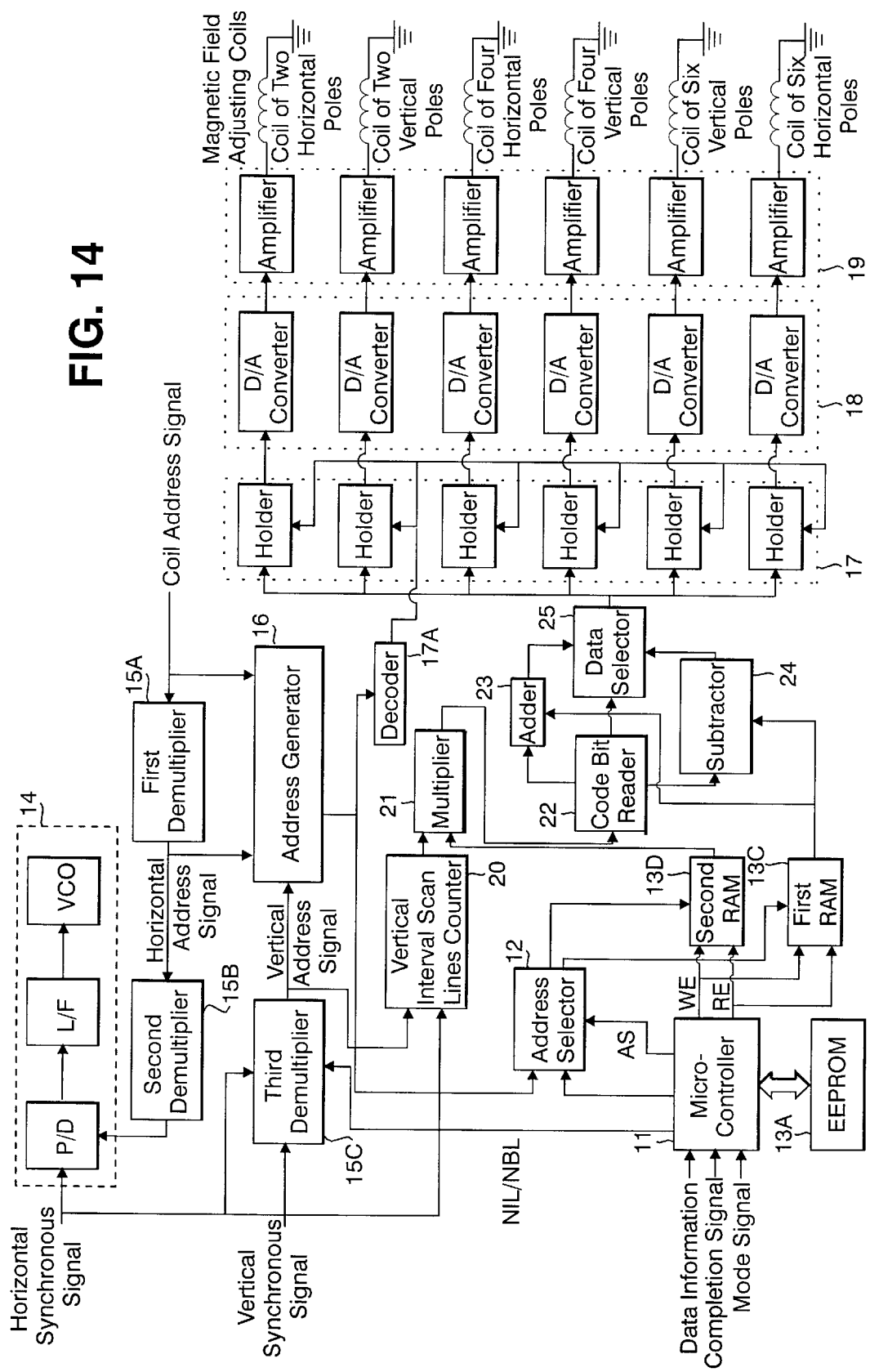
FIG. 14 is a block diagram illustrating a construction of the digital dynamic convergence correction device according to another embodiment of the present invention.

To supplement the drawback of the convergence correction circuit according to the present invention, and more particularly to improve the problem of the convergence correction circuit according to the present invention as shown in FIG. 12, another embodiment of the present invention is illustrated in FIG. 14.

The convergence correction circuit according to the present invention as shown in FIG. 14 shares the same construction with the one in FIG. 12 as far as the drawing reference numerals 14 to 19, 11 and 13A are concerned.

Therefore, the operation of the same construction is omitted based on the description of the embodiment made with reference to FIG. 12, and only the distinguished parts will be described herein below.

The convergence correction circuit in FIG. 14 comprises: a control unit including the micro-controller identified by the drawing reference numeral 11, and a first address selector identified by the drawing reference numeral 12A; a storing unit including the EEPROM identified by the drawing reference numeral 13A, a first RAM and a second RAM identified by the drawing reference numerals 13C and 13D; an extracted address generation unit identified by the drawing reference numerals 14, 15A, 15B, 15C or 16; an output unit identified by the drawing reference numerals 17, 17A, 18 or 19; a correction data interpolation unit including a scan line counter of the vertical interval identified by the drawing reference numeral 20, a multiplier identified by the drawing reference numeral 21, and a code bit reader identified by the drawing reference numeral 22, an adder identified by the drawing reference numeral 23, a subtracter identified by the drawing reference numeral 24, and a data selector identified by the drawing reference numeral 25.

As described with reference to the embodiment of the present invention shown in FIG. 12, the micro-controller 11 generates a recording address for receiving the correction data, interpolation data and a control command signal provided from outside, and storing the same in the memory.

Here, the interpolation data are the values dividing a difference between each correction data of the control points of the screen defined by the crossing point and the correction data of the control point positioned beneath thereof on the cross hatch pattern screen shown in FIG. 11 by the demultiplying number NIL of the third demultiplier which is a number of the horizontal scan lines included within one vertical interval. The interpolation data are also equivalent to the incremental value of the correction data to be increased or decreased in accordance with increase of the horizontal scan lines within one vertical interval. In other words, the interpolation data corresponding to one control point MCP I, J on the screen in FIG. 11 are the values calculated to be (MCP(I, J+1)−MCP(I, J))/NIL. Such calculation is performed by the control computer in FIG. 10.

Here, the micro-controller 11 manipulates the address selector 12 by means of the control signal AS when the completion signal is in "off" state as a control command signal to connect an address bus so that the recording address outputted from the micro-controller 11 can be transferred to an address port of the first RAM 13C and the second RAM 13D. The micro-controller 11 then stores the correction data in the first RAM 13C, and the interpolation data in the second RAM 13D. Thereafter, when the completion signal is in "on" state, the correction data and the interpolation data are stored in the EEPROM 13A.

If the "off" state which is an open-loop mode is received as a mode signal, the micro-controller 11 reads the correction data and the interpolation data stored in the EEPROM 13A, reads the data after transferring the same to the corresponding RAM 13C and 13D.

If all of the correction data and the interpolation data are recorded and stored in the RAM 13C and 13D, the micro-controller 11 generates a control signal AS and manipulates the address selector 12 so that the extracted addresses of the address generator 16 can be simultaneously transferred to the address bus of the first RAM 13C and the second RAM 13D. The micro-controller 11 also induces the first and the second RAM 13C, 13D to be in a reading state by generating a control signal.

Here, the extracted address generation unit identified by the drawing reference numerals 14 to 16 receives the horizontal and vertical synchronous signals as described with reference to FIG. 12, synchronizes the signals with the scanning time of each of the control points of the screen so as to output extracted addresses of the correction data and the interpolation data stored in the first and the second RAM 13C, 13D. The extracted addresses are simultaneously transferred to the address port of the first and the second RAM 13C, 13D.

Thereafter, the interpolation unit interpolates the correction data in accordance with the horizontal scan line number counted within one vertical interval by using the correction data and the interpolation data simultaneously outputted from the first and the second RAM 13C, 13D in accordance with the extracted addresses of the extracted address generation unit.

The vertical interval scan line counter 20 in FIG. 14 receives and counts the horizontal synchronous signal as the clock signal, receives the vertical address signal as the clock signal. The vertical scan line counter 20 is initialized to output the horizontal scan line number scanned within one vertical interval.

The horizontal scan line number data outputted from the vertical interval scan line counter 20 are multiplied in the multiplier 21 by the interpolation data outputted from the second RAM 13D so as to be converted to an incremental value with respect to the correction data and inputted to the adder and the subtracter through the code bit reader 22.

The adder and the subtracter output an added value or a subtracted value with respect to the correction data of the first RAM 13C inputted as constant values within one vertical interval. This is to lineally interpolate the correction data in a vertical direction within one vertical interval.

The code bit reader 22 manipulates the data selector 25 to select output of the adder or the subtracter in accordance with the read state of the code bit. Subsequently, the lineally interpolated correction data corresponding to the horizontal scan lines that are being scanned are transferred to the output unit.

A description of the subsequent operation identical to that of the embodiment of the present invention made with reference to FIG. 12 is omitted here.

The method for controlling digital dynamic convergence and the system thereof according to the present invention as described above enables a worker to approach controlling of the convergence with respect to the control points defined by each crossing point on a screen of a cross hatch pattern. Based on the control, the worker can perfectly correct the astigmatism on a partial basis by applying a control voltage or a control current to the magnetic field adjusting coils of two poles, four poles or six poles in time of the scanning of the screen at each control point. A screen of high resolution available for an HDTV can be realized by such a perfect correction of the convergence.

Further, the digital dynamic convergence controller according to the present invention has a structure suitable for control of the convergence and automation of an integrated tube component (ITC). An automatic convergence correction system can be easily established as a system, in which a control computer calculates a control voltage or a control current to be applied to the magnetic field adjusting coils of two poles, four poles or six poles with respect to each control point of the screen by using the information on convergence measured by an external screen convergence measuring device, converts the calculated control voltage or control current to digitalized correction data, and inputs the correction data to the digital dynamic convergence controller. Productivity can be greatly enhanced by this automation system.

Further, the digital dynamic convergence controller, which includes an EEPROM, is applicable to management of the quality of products by recording additional data of the producing process.

The following is a description of the correlation between the portion where the digital dynamic convergence controller is mounted and the magnetic field adjusting coils made with reference to the accompanying drawings.

Figure 15:
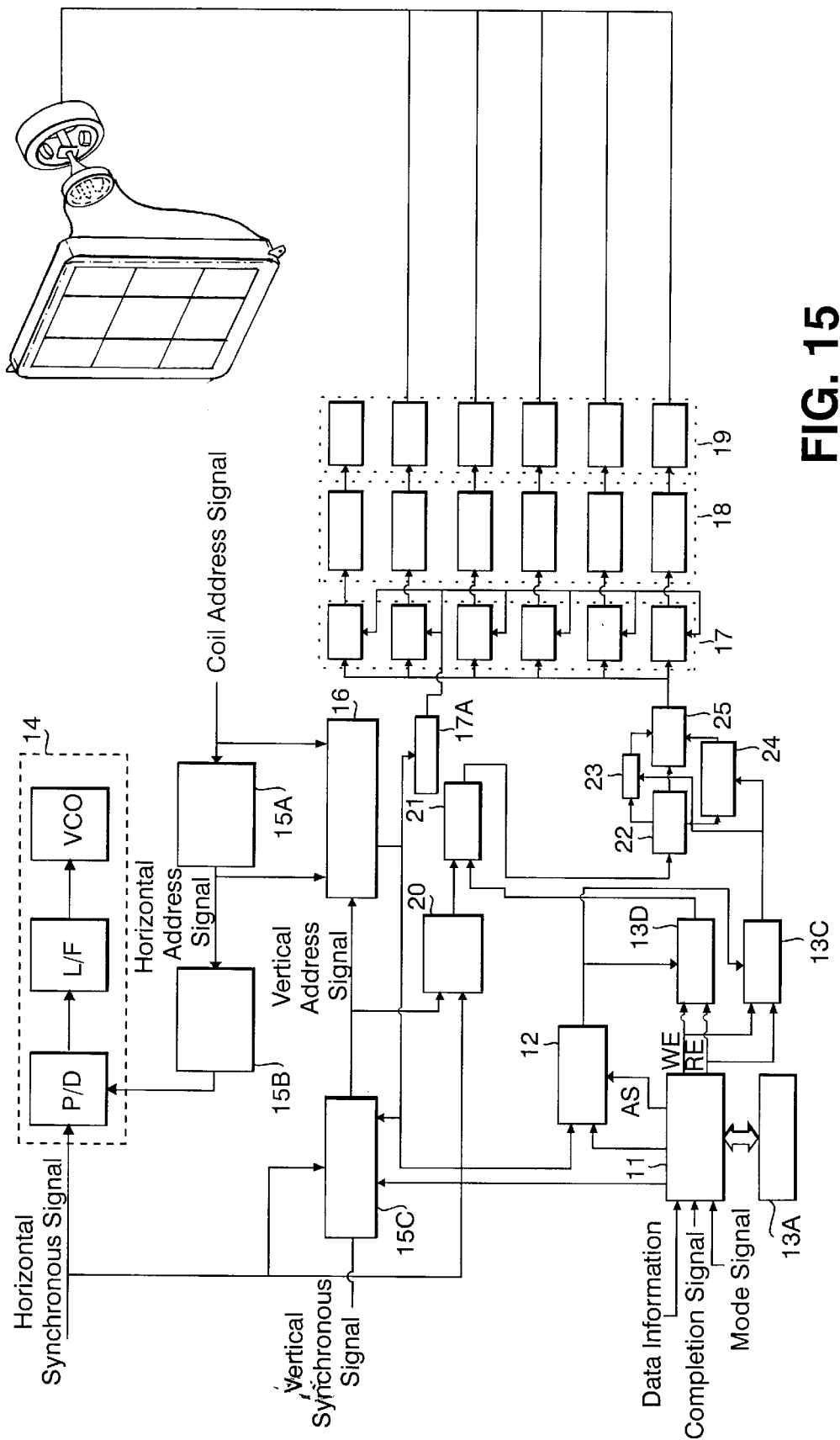
FIG. 15 is a diagram illustrating a combination of the digital dynamic convergence correction device according to another embodiment of the present invention with a CRT.

FIG. 15 is a diagram illustrating a combination of the digital dynamic convergence correction device according to another embodiment of the present invention with a CRT. An output signal is connected to the magnetic field adjusting yoke unit of the CRT.

Figure 16:
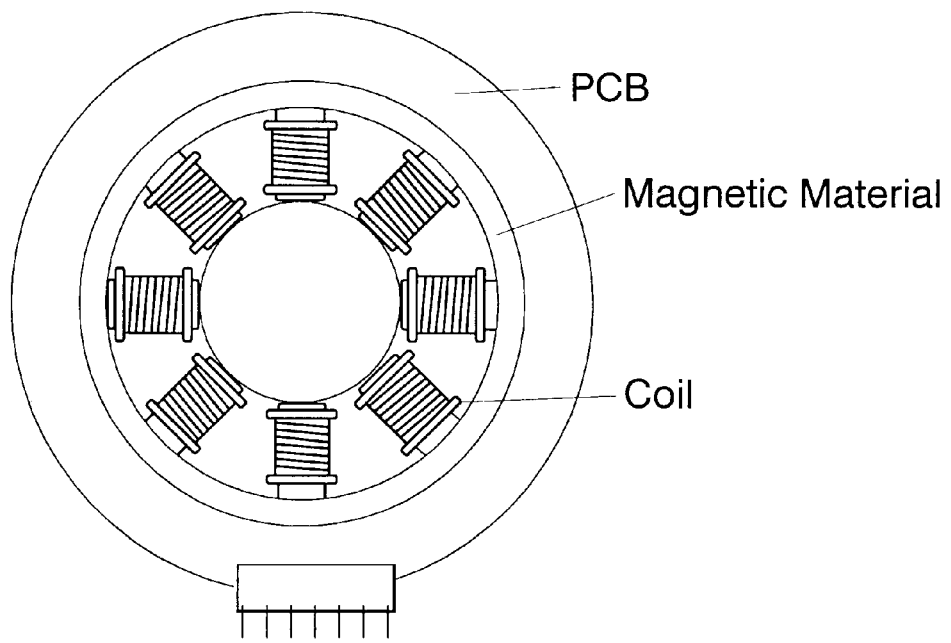
FIG. 16 is a diagram illustrating a construction of a magnetic field adjusting yoke.

The magnetic field adjusting yoke unit comprises four pairs of facing coils wound double or triple, and earth pins 2H, 2V, 4H, 4V, 6H and 6V as shown in FIG. 16 from the left side in order.

Therefore, the operating state of the magnetic field adjusting yoke corresponding to each control state is as shown in FIGS. 17 to 22 and 16 if the digital dynamic convergence controller is in operation.

Figure 17:
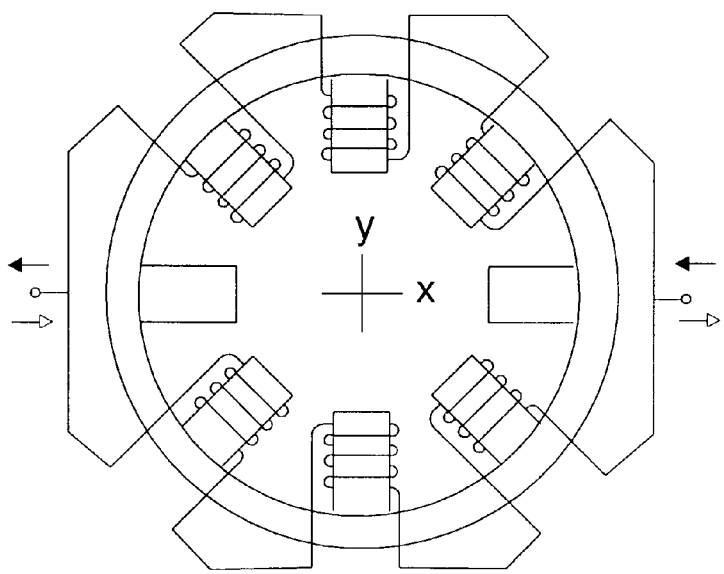
FIG. 17 is a diagram illustrating an operation of the magnetic field adjusting yoke in FIG. 16 as magnetic field adjusting coils having a structure of two horizontal poles.
Figure 18:
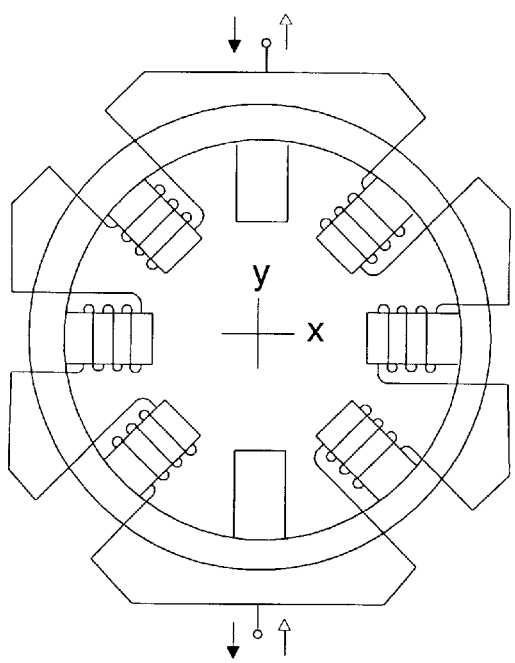
FIG. 18 is a diagram illustrating an operation of the magnetic field adjusting yoke in FIG. 16 as magnetic field adjusting coils having a structure of two vertical poles.
Figure 19:
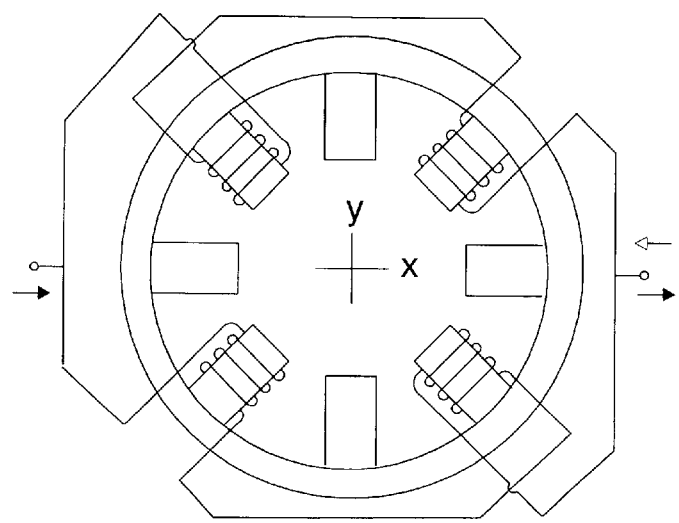
FIG. 19 is a diagram illustrating an operation of the magnetic field adjusting yoke in FIG. 16 as magnetic field adjusting coils having a structure of four horizontal poles.

To be specific, in the constructions shown in FIG. 12 or 14, the output signal of the amplifying unit identified by the drawing reference numeral 19 is applied to a terminal pin in FIG. 16. An operation of the magnetic field adjusting coils of two horizontal poles is as shown in FIG. 17, while an operation of the magnetic field adjusting coils of two vertical poles is as shown in FIG. 18. An operation of the magnetic field adjusting coils of four horizontal poles is as shown in FIG. 19.

Figure 20:
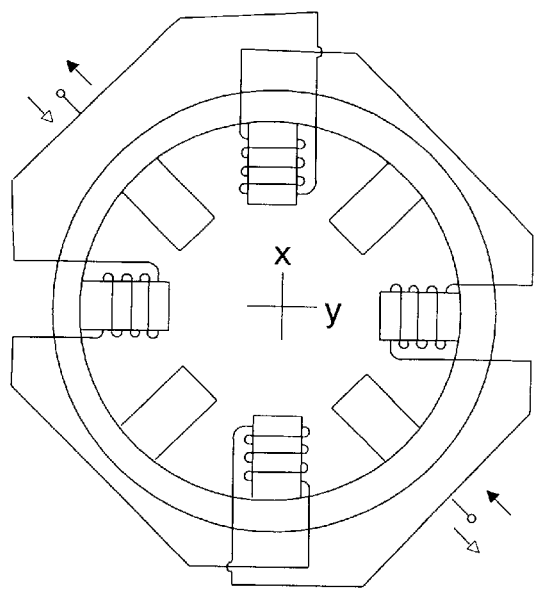
FIG. 20 is a diagram illustrating an operation of the magnetic field adjusting yoke in FIG. 16 as magnetic field adjusting coils having a structure of four vertical poles.
Figure 21:
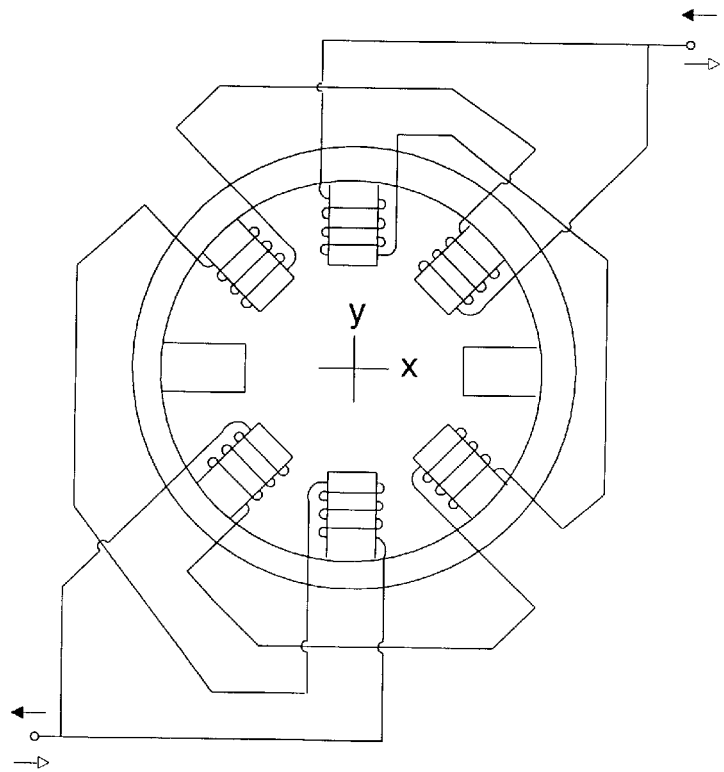
FIG. 21 is a diagram illustrating an operation of the magnetic field adjusting yoke in FIG. 16 as magnetic field adjusting coils having a structure of six horizontal poles.
Figure 22:
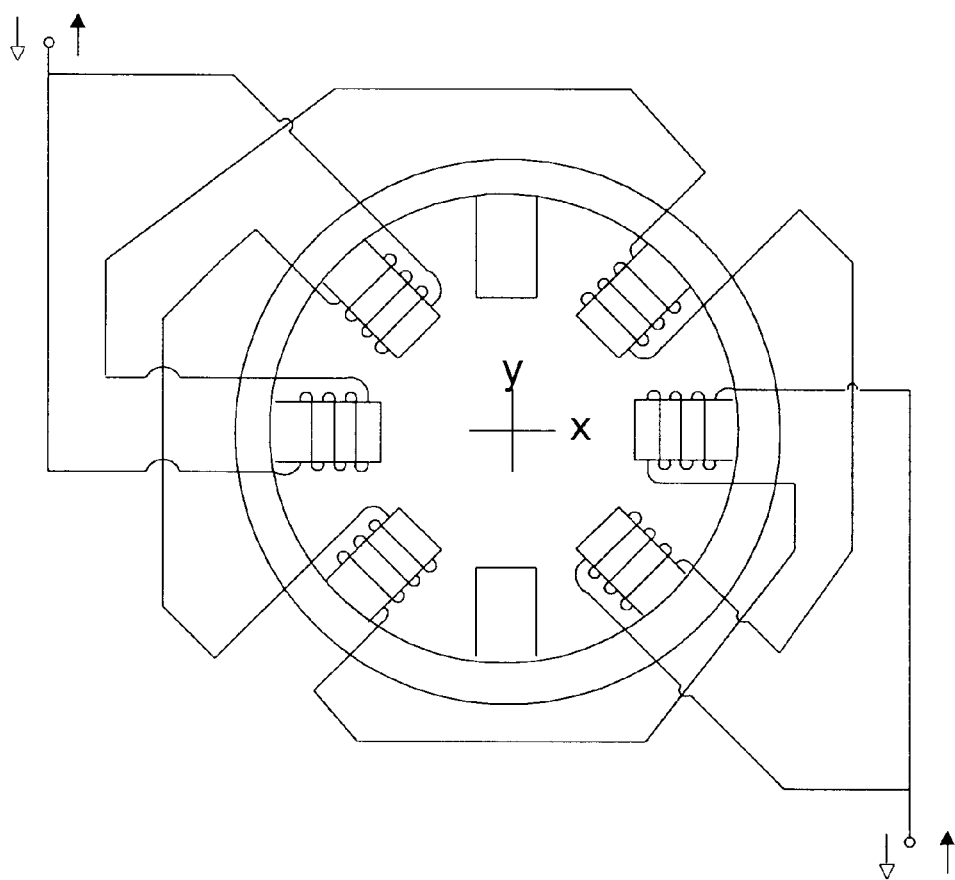
FIG. 22 is a diagram illustrating an operation of the magnetic field adjusting yoke in FIG. 16 as magnetic field adjusting coils having a structure of six vertical poles.

In addition, an operation of the magnetic field adjusting coils of four vertical poles is as shown in FIG. 20. An operation of the magnetic field adjusting coils of six horizontal poles is as shown in FIG. 21, while an operation of the magnetic field adjusting coils of six vertical poles is as shown in FIG. 22.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for controlling digital dynamic convergence, comprising:
   a first step of extracting a plurality of screen positions corresponding to the crossing points on the cross hatch pattern screen in a screen display area of a CRT picture device;
   a second step of mapping a data storing address provided for predetermined data storing means and the plurality of screen positions extracted in the first step;

a third step of measuring a degree of convergence astigmatism on each screen position extracted in the first step;

a fourth step of generating correction data with respect to the convergence astigmatism at each screen position measured in the third step;

a fifth step of storing the misconvergence correction data at each screen position generated in the fourth step in the data storing address mapped in the fourth step; and a sixth step of individually correcting convergence astigmatism at each screen position in the scanning order of electron beams when the image is displayed by reference to the correction data stored in the predetermined data storing means in the fifth step.

2. The method of claim 1, wherein the misconvergence correction data are adjusting signals of magnetic field adjusting coils having a structure of two poles, four poles or six poles generally used for correction of dynamic convergence.

3. A digital dynamic convergence control system for individual and independent correction of convergence, comprising:

a measuring device for reading a predetermined image pattern displayed on a screen to measure the degree of misconvergence by reference thereto;

central control means for generating correction data corresponding to the degree of misconvergence measured by the measuring device; and a digital dynamic convergence correction device for receiving the correction data from the central control means, storing the correction data in an internal memory, reading the correction data from the memory in time of screen scanning by using an image synchronous signal, converting the correction data to a voltage or a current, and outputting the converted voltage or current to magnetic field adjusting coils.

4. The digital dynamic convergence system of claim 3, wherein the image pattern, which is an object of the convergence correction, is composed of each crossing point of a crosshatch pattern.

5. The digital dynamic convergence system of claim 3, wherein the digital dynamic convergence correction device comprises:

a control unit for receiving a control command signal and correction data provided from the central control means, generating a recording address to be stored in the memory according to the control command, and controlling connections of a memory address bus and the data bus either to store the correction data in the memory or to extract correction data from the memory based on the recording address;

a memory for storing the misconvergence correction data according to the recording address set by the control unit;

an extracted address generation unit for generating extracted addresses to read the correction data stored in the memory by receiving horizontal and vertical synchronous signals extractable from the image signals inputted to a CRT picture device, and synchronizing the horizontal and vertical synchronous signals at scanning times of the crossing points on a cross hatch pattern screen; and an output unit for converting and amplifying the misconvergence correction data outputted from the memory according to the extracted addresses generated by the extracted address generation unit to a voltage or a current so as to be applied to magnetic field adjusting coils having a structure of two poles, four poles or six poles in order for correcting the deflected degree of electron beams.

6. The digital dynamic convergence system of claim 5, comprising:

an address selector for controlling the address bus and the data bus of the memory, and the respective connections of the extracted address generation unit and the output unit according to an inputted control signal; and a micro-controller for generating a recording address to be stored in the memory by receiving the control command signal and the correction data provided by the central control means, and manipulating the address selector to transfer the recording address to the address port of the memory when a correction signal has been provided by the control command.

7. The digital dynamic convergence system of claim 5, wherein the extracted address generator comprises:

a phase-locked loop (PLL) for receiving a horizontal synchronous signal as a reference signal, and generating a coil address signal;

a first demultiplier for demultiplying the clock signal outputted from the PLL, and generating a horizontal address signal;

a second demultiplier for receiving and re-demultiplying the output signal of the first demultiplier so as to be transferred to the PLL;

a third demultiplier for generating a vertical address signal by demultiplying the horizontal synchronous signal as the clock signal by reference to the vertical synchronous signal; and an address generator for generating a memory address to extract the misconvergence correction data stored in the memory by synthesizing the vertical address signal, horizontal address signal, and the coil address signal.

8. The digital dynamic convergence system of claim 7, wherein the third demultiplier uses the vertical synchronous signal and data on the number of horizontal scan lines existing on one vertical interval to synchronize beginning of the vertical address with the displaying point of time of the screen for generating the vertical address signal, and uses data on the number of horizontal scan lines beginning with the vertical synchronous signal to a display of the screen a control signal of a counter for demultiplication.

9. The digital dynamic convergence system of claim 5, wherein the output unit comprises:

a plurality of signal amplifiers matched with each magnetic field adjusting coil corresponding to a horizontal side and a vertical side of the magnetic field adjusting coils having a structure of two poles, four poles or six poles for misconvergence correction;

a plurality of D/A converters matched with each of the signal amplifiers for converting an inputted digital misconvergence correction signal to an analog signal; and a plurality of holders matched with each of the D/A converters for receiving the misconvergence correction data outputted from the memory, and renewing the output of the misconvergence correction data with respect to the magnetic field adjusting coils according to the coil address signal generated from the extracted address generation unit.

10. The digital dynamic convergence system of claim 9, wherein the holder maintains the existing misconvergence correction data until the corresponding coil address signal is provided again.

11. A digital dynamic convergence correction device, comprising:

a memory for storing individual misconvergence correction data for each crossing point of the crosshatch pattern screen;

an extracted address generation unit for receiving horizontal and vertical synchronous signals extractable from inputted image signals, generating a coil address and a horizontal address signal by reference to the horizontal synchronous signal, and a vertical synchronous signal by reference to the vertical synchronous signal; and an output unit for converting and amplifying the misconvergence correction data outputted from the memory according to the extracted addresses generated from the extracted address generation unit to a voltage or a current so as to be applied to the magnetic field adjusting coils having a structure of two poles, four poles or six poles for correction of the deflected degree of electron beams.

12. The digital dynamic convergence correction device of claim 11, further comprising:

an address selector for selecting an output signal either from the control unit or from the extracted address generation unit so as to be transferred to an address port of the memory; and a micro-controller for controlling an operation of the address selector and the memory to output the misconvergence correction data stored in an address selected in accordance with the operation of the address selector.

13. The digital dynamic convergence correction device of claim 11, wherein the extracted address generation unit comprises:

a PLL for receiving a horizontal synchronous signal extractable from the inputted image signal as a reference signal, and generating a coil address signal;

a first demultiplier for demultiplying the clock signal outputted from the PLL, and generating a horizontal address signal;

a second demultiplier for receiving and re-demultiplying the output signal of the first demultiplier so as to be transferred to the PLL;

a third demultiplier for generating a vertical address signal by demultiplying the horizontal synchronous signal as the clock signal by reference to the vertical synchronous signal; and an address generator for generating a memory address to extract the misconvergence correction data stored in the memory by synthesizing the vertical address signal, the horizontal address signal, and the coil address signal.

14. The digital dynamic convergence correction device of claim 13, wherein the third demultiplier uses the vertical synchronous signal and data on the number of horizontal scan lines existing on one vertical interval to synchronize beginning of the vertical address with the displaying point of time of the screen for generating the vertical address signal, and uses data on the number of horizontal scan lines beginning with the vertical synchronous signal to a display of the screen a control signal of a counter for demultiplication.

15. The digital dynamic convergence correction device of claim 11, wherein the output unit comprises:

a plurality of signal amplifiers matched with each magnetic field adjusting coil corresponding to a horizontal side and a vertical side of the magnetic field adjusting coils having a structure of two poles, four poles or six poles for misconvergence correction;

a plurality of D/A converters matched with each of the signal amplifiers for converting an inputted digital misconvergence correction signal to an analog signal; and a plurality of holders matched with each of the D/A converters for receiving the misconvergence correction data outputted from the memory, and renewing the output of the misconvergence correction data with respect to the magnetic field adjusting coils according to the coil address signal generated from the extracted address generation unit.

16. The digital dynamic convergence correction device of claim 15, wherein the holder maintains the existing misconvergence correction data until the corresponding coil address signal is provided again.

17. A method for controlling digital dynamic convergence, comprising:

a first step of extracting a plurality of screen positions corresponding to the crossing points on the cross hatch pattern screen in a screen display area of a CRT picture device;

a second step of mapping a data storing address provided for predetermined data storing means and the plurality of screen positions extracted in the first step;

a third step of measuring a degree of convergence astigmatism on each screen position extracted in the first step;

a fourth step of generating correction data with respect to the convergence astigmatism at each screen position measured in the third step;

a fifth step of storing the misconvergence correction data at each screen position generated in the fourth step in the data storing address mapped in the fourth step;

a sixth step of individually correcting convergence astigmatism at each screen position in the scanning order of electron beams when the image is displayed by reference to the correction data stored in the predetermined data storing means in the fifth step; and a seventh step of performing convergence correction with the lineal interpolating value of the correction data using the interpolation data in a vertical direction in the area between each screen position while performing the correction of convergence astigmatism according to the sixth step.

18. A digital dynamic convergence system characterized by performing an individual and independent correction of convergence with respect to crossing patterns of a cross hatch pattern to remove discontinuity of the convergence correction in a vertical direction by means of a linear interpolation in accordance with increase of horizontal scan lines with respect to a screen area between each convergence correction position, the system comprising:

a measuring device for reading a predetermined image pattern displayed on a screen to measure the degree of misconvergence by reference thereto;

central control means for generating correction data corresponding to the degree of misconvergence measured by the measuring device; and a digital dynamic convergence correction device for receiving the correction data from the central control means, storing the correction data in an internal memory, reading the correction data from the memory in time of screen scanning by using an image synchronous signal, converting the correction data to a voltage or a current, and outputting the converted voltage or current to magnetic field adjusting coils.

19. The digital dynamic convergence system of claim 18, wherein the digital dynamic convergence correction device comprises:

a control unit either for receiving convergence correction data, interpolation data and a control command signal provided by the central control means, generating a recording address to be stored in memories, storing the correction data and the interpolation data in two separate memories based on the recording address, or for controlling connection of a memory address bus and a data bus to extract the correction data and the interpolation data from each memory;

a first memory for storing the misconvergence correction data inputted to the control unit in accordance with the recording address;

a second memory for storing the interpolation data to perform interpolation at the crossing point of the cross hatch pattern screen in a vertical direction in accordance with the recording address identical to the first memory;

an extracted address generation unit for generating extracted address to read the correction data and the interpolation data stored in the first and the second memories by synchronizing with the scanning time of the screen after receiving horizontal and vertical synchronous signals extractable from image signals;

an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for converting and amplifying the correction data outputted from the interpolation unit to a voltage or a current so as to be applied to magnetic field adjusting coils having a structure of two poles, four poles or six poles in order for correction of a deflected degree of electron beams.

20. A digital dynamic convergence correction device, comprising:

a first memory for storing individual misconvergence correction data with respect to each crossing point of a crosshatch pattern screen;

a second memory for storing interpolation data for lineal interpolation within a vertical interval in accordance with increase of horizontal scan lines between each crossing point;

an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal;

an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for selectively applying the misconvergence correction data outputted from the interpolation unit based on the control signal of the control unit in accordance with the coil address signal of the extracted address generation unit to the magnetic field adjusting coils having two or more poles for correction of the deflected degree of the electron beams.

21. A deflection yoke comprising:

a coil separator consisting of a screen unit engaged with a screen surface of the CRT, a rear cover, and a neck unit elongated from a central surface of the rear cover so as to be engaged with an electron gun unit of the CRT;

horizontal and vertical deflection coils provided on internal and external surfaces of the coil separator to make magnetic fields deflected in order to deflect electron beams in a horizontal direction and a vertical direction;

four pairs of mutually facing magnetic field adjusting coils wound double or triple for correcting information on deflection of the electron beams in accordance with the deflection coils by being operated to have a structure of two or more poles in accordance with an operation control signal;

a memory for storing individual misconvergence correction data with respect to each crossing point of a crosshatch pattern screen;

an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal; and an output unit for converting misconvergence correction data outputted from the memory in accordance with the control signal of the control unit to a current or a voltage so as to be applied to magnetic adjusting coils having two or more poles for correction of the deflected degree of the electron beams.

22. A deflection yoke comprising:

a coil separator consisting of a screen unit engaged with a screen surface of the CRT, a rear cover, and a neck unit elongated from a central surface of the rear cover so as to be engaged with an electron gun unit of the CRT;

horizontal and vertical deflection coils provided on internal and external surfaces of the coil separator to make magnetic fields deflected in order to deflect electron beams in a horizontal direction and a vertical direction;

four pairs of mutually facing magnetic field adjusting coils wound double or triple for adjusting information on deflection of the electron beams in accordance with the deflection coils by being operated to have a structure of two or more poles in accordance with an operation control signal;

a first memory for storing individual misconvergence correction data with respect to each crossing point of a crosshatch pattern screen;

a second memory for storing interpolation data for lineal interpolation within a vertical interval in accordance with increase of horizontal scan lines between each crossing point;

an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal;

an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for selectively applying the misconvergence correction data outputted from the interpolation unit based on the control signal of the control unit in accordance with the coil address signal of the extracted address generation unit to the magnetic field adjusting coils having two or more poles for correction of the deflected degree of the electron beams.

23. A display device comprising:

a deflection yoke for deflecting electron beams emitted from an electron gun;

four pairs of mutually facing magnetic field adjusting coils wound double or triple for adjusting information on deflection of the electron beams caused by an operation of the deflection yoke by being operated in accordance with an operation control signal to have a structure of two or more poles;

a memory for storing individual misconvergence correction data with respect to each crossing point of a cross hatch pattern screen;

an extracted address generation unit for receiving extractable horizontal and vertical synchronous signals from inputted image signals, generating a coil address signal and a horizontal address signal by reference to the horizontal synchronous signal, and generating a vertical address signal by reference to the vertical synchronous signal; and an output unit for converting and amplifying the misconvergence correction data outputted from the memory according to the extracted addresses generated from the extracted address generation unit to a voltage or a current so as to be applied to the magnetic field adjusting coils having structure of two poles, four poles and six poles for correction of the deflected degree of electron beams.

24. A display device comprising:

a deflection yoke for deflecting electron beams emitted from an electron gun;

four pairs of mutually facing magnetic field adjusting coils wound double or triple for adjusting information on deflection of the electron beams caused by an operation of the deflection yoke by being operated in accordance with an operation control signal to have a structure of two or more poles;

a first memory for storing individual misconvergence correction data with respect to each crossing point of a crosshatch pattern screen;

a second memory for storing the interpolation data by the control unit to perform interpolation at the crossing point of the cross hatch pattern screen in a vertical direction in accordance with the recording address identical to the first memory;

an extracted address generation unit for generating extracted addresses to read the correction data and the interpolation data stored in the first and the second memories by synchronizing with the scanning time of the crossing points of the cross hatch pattern screen after receiving horizontal and vertical synchronous signals extractable from image signals;

an interpolation unit for outputting correction data lineally interpolated in a vertical direction within one vertical interval by computing the correction data and the interpolation data outputted from the first and the second memories in accordance with the extracted addresses generated by the extracted address generation unit based on the horizontal scan line numbers counted from zero in accordance with scanning of a horizontal scanning layer within the one vertical interval with respect to division of the cross hatch pattern screen; and an output unit for converting and amplifying the correction data outputted from the interpolation unit to a voltage or a current so as to be applied to magnetic field adjusting coils having a structure of two poles, four poles or six poles for correction of a deflected degree of electron beams.

* * * * *